United States Patent
Du et al.

(10) Patent No.: US 11,451,553 B2
(45) Date of Patent: *Sep. 20, 2022

(54) SENSOR-BASED HUMAN AUTHORIZATION EVALUATION

(71) Applicant: Live Nation Entertainment, Inc., Beverly Hills, CA (US)

(72) Inventors: Fengpei Du, Santa Monica, CA (US); Michael Lane, Beverly Hills, CA (US); Kenneth Ives-Halperin, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,566

(22) Filed: Aug. 28, 2020

(65) Prior Publication Data

US 2021/0160239 A1    May 27, 2021

Related U.S. Application Data

(60) Continuation of application No. 16/298,453, filed on Mar. 11, 2019, now Pat. No. 10,764,293, which is a
(Continued)

(51) Int. Cl.
*G06F 21/31* (2013.01)
*H04L 9/40* (2022.01)
(Continued)

(52) U.S. Cl.
CPC .............. *H04L 63/10* (2013.01); *G06F 21/31* (2013.01); *G06F 21/316* (2013.01); *H04L 47/60* (2013.01);
(Continued)

(58) Field of Classification Search
CPC ......... H04L 29/06; H04L 29/08; H04L 12/58; H04L 12/869; H04L 29/12; H04L 63/10;
(Continued)

(56) References Cited

U.S. PATENT DOCUMENTS 8,730,040 B2    5/2014  Donovan
9,264,419 B1 *  2/2016  Johansson ................ G09C 1/00
(Continued)

FOREIGN PATENT DOCUMENTS

EP    2 541 452 A1    1/2013
WO    2011/100519 A2  8/2011
(Continued)

OTHER PUBLICATIONS

Senecal; David, "Identifying and mitigating unwanted bot traffic" The Akamia Blog, Jun. 27, 2013, 3 pages, retrieved from https://blogs.akamai.com/2013/identifying-and-mitigating-unwanted-bot-traffic.html on Feb. 22, 2017.
(Continued)

*Primary Examiner* — Jayesh M Jhaveri
(74) *Attorney, Agent, or Firm* — Kilpatrick Townsend & Stockton, LLP

(57) ABSTRACT

A resource-access management system detects whether a user is authorized to access resources. The system may include a user device being configured to include a sensor that detects sensor data associated with the user. Further, the system includes a client qualification engine that determines whether or not a client is authorized to access the resources by comparing the sensor data with a plurality of patterns for evaluating whether or not the user is an authorized user. User scores are generated based on the compared sensor data and the plurality of patterns. Further, a composite score corresponding to the user is generated using the sensor data, plurality of patterns, and one or more additional criteria.
(Continued)

Whether the user is granted access to the resources, presented with unauthorized user tests, or blocked from access to the resources depends on the composite score and threshold values.

16 Claims, 23 Drawing Sheets

Related U.S. Application Data continuation of application No. 15/830,543, filed on Dec. 4, 2017, now Pat. No. 10,230,729, which is a division of application No. 15/409,793, filed on Jan. 19, 2017, now Pat. No. 9,838,394, which is a division of application No. 14/791,128, filed on Jul. 2, 2015, now Pat. No. 9,584,524.

(60) Provisional application No. 62/020,787, filed on Jul. 3, 2014.

(51) Int. Cl.
| | |
|---|---|
| *H04L 67/12* | (2022.01) |
| *H04L 47/60* | (2022.01) |
| *H04L 51/04* | (2022.01) |
| *H04L 67/52* | (2022.01) |
| *H04L 67/50* | (2022.01) |
| *H04L 51/222* | (2022.01) |

(52) U.S. Cl.
CPC ............ *H04L 51/04* (2013.01); *H04L 63/102* (2013.01); *H04L 67/12* (2013.01); *H04L 67/52* (2022.05); *H04L 67/535* (2022.05); *G06F 2221/2111* (2013.01); *G06F 2221/2133* (2013.01); *H04L 51/222* (2022.05)

(58) Field of Classification Search
CPC ....... H04L 63/102; H04L 67/12; H04L 67/18; H04L 67/22; H04L 47/60; H04L 51/04; H04L 61/2007; H04L 9/40; G06F 2221/2111; G06F 2221/2133; G06F 21/31; G06F 21/316
See application file for complete search history.

(56) References Cited

U.S. PATENT DOCUMENTS

| | | | | |
|---|---|---|---|---|
| 9,407,754 | B1* | 8/2016 | Benoit | .............. H04M 1/72463 |
| 9,584,524 | B2 | 2/2017 | Du | |
| 9,638,394 | B2 | 12/2017 | Du | |
| 10,230,729 | B2 | 3/2019 | Du | |
| 10,764,293 | B2 | 9/2020 | Du | |
| 2006/0200258 | A1 | 9/2006 | Hoffberg | |
| 2010/0095374 | A1* | 4/2010 | Gillum | ................ H04L 63/1416 |
| | | | | 726/22 |
| 2010/0328074 | A1* | 12/2010 | Johnson | .................. G06F 21/31 |
| | | | | 340/573.1 |
| 2011/0130636 | A1 | 6/2011 | Daniel | |
| 2011/0202994 | A1 | 8/2011 | Hicks | |
| 2012/0254940 | A1 | 10/2012 | Raper | |
| 2012/0297190 | A1 | 11/2012 | Shen | |
| 2013/0044055 | A1 | 2/2013 | Karmarkar | |
| 2013/0191908 | A1 | 7/2013 | Klein | |
| 2013/0276125 | A1 | 10/2013 | Bailey | |
| 2014/0007224 | A1* | 1/2014 | Lu | ............................ G06F 21/32 |
| | | | | 726/19 |
| 2014/0019488 | A1 | 1/2014 | Wo | |
| 2014/0173286 | A1 | 6/2014 | Novak | |
| 2014/0181936 | A1 | 6/2014 | Picard | |
| 2014/0317734 | A1 | 10/2014 | Valencia | |
| 2015/0007289 | A1 | 1/2015 | Godse | |
| 2015/0128236 | A1* | 5/2015 | Moscicki | ............ H04L 63/0876 |
| | | | | 726/7 |
| 2016/0063471 | A1* | 3/2016 | Kobres | ................ G06Q 20/206 |
| | | | | 705/18 |

FOREIGN PATENT DOCUMENTS

| | | |
|---|---|---|
| WO | 2014/133711 A1 | 9/2014 |
| WO | 2014/142947 A1 | 9/2014 |

OTHER PUBLICATIONS

International Application No. PCT/US2015/039133 received an Invitation to Pay Additional Fees and Communication Relating to the Results of the Partial International Search dated Oct. 13, 2015, 4 pages.
International Application No. PCT/US2015/039133 received an International Search and Written Opinion Report dated Dec. 23, 2015, 19 pages.
International Application No. PCT/US2015/039133 received an International Report of Patentability for dated Jan. 12, 2017, 13 pages.
U.S. Appl. No. 14/791,128 received a First Action Interview Pilot Program Pre-interview Communication dated Oct. 21, 2015, 3 pages.
U.S. Appl. No. 14/791,128 received a First Action Interview Office Action Summary dated Mar. 18, 2016, 6 pages.
U.S. Appl. No. 14/791,128 received a Final Office Action dated Jul. 21, 2016, 11 pages.
U.S. Appl. No. 14/791,128 received a Notice of Allowance dated Oct. 19, 2016, 8 pages.
U.S. Appl. No. 15/409,793 received a First Action Interview Pilot Program Pre-interview Communication dated Feb. 28, 2017, 4 pages.
U.S. Appl. No. 15/409,793 received a First Action Interview Office Action Summary dated May 11, 2017, 7 pages.
U.S. Appl. No. 15/409,793 received a Notice of Allowance dated Aug. 3, 2017, 8 pages.
U.S. Appl. No. 15/830,543 received a First Action Interview Office Action Summary dated May 23, 2018, 19 pages.
U.S. Appl. No. 15/830,543 received a First Action Interview Pilot Program Pre-interview Communication dated Jan. 25, 2018, 4 pages.
U.S. Appl. No. 15/830,543 received Notice of Allowance dated Oct. 24, 2018. 6 pages.
U.S. Appl. No. 16/298,453 received a U.S. Appl. No. 16/298,453 Non-Final Office Action dated Dec. 26, 2019, 7 pages.
U.S. Appl. No. 16/298,453 Notice of Allowance dated Apr. 20, 2020, 6 pages.

\* cited by examiner

SENSOR-BASED HUMAN AUTHORIZATION EVALUATION

CROSS REFERENCE TO RELATED APPLICATIONS

This application is a continuing application of commonly assigned U.S. patent application Ser. No. 16/298,453, filed Mar. 11, 2019, entitled "SENSOR-BASED HUMAN AUTHORIZATION EVALUATION," which is a continuing application of commonly assigned U.S. patent application Ser. No. 15/830,543 filed Dec. 4, 2017, now U.S. Pat. No. 10,230,729, issued Mar. 12, 2019, entitled "SENSOR-BASED HUMAN AUTHORIZATION EVALUATION," which is a divisional application of commonly assigned U.S. patent application Ser. No. 15/409,793 filed Jan. 19, 2017, now U.S. Pat. No. 9,838,394 issued Dec. 5, 2017, entitled "SENSOR-BASED HUMAN AUTHORIZATION EVALUATION," which is divisional application of U.S. patent application Ser. No. 14/791,128 filed Jul. 2, 2015, now U.S. Pat. No. 9,584,524 issued Feb. 28, 2017 entitled "SENSOR-BASED HUMAN AUTHORIZATION EVALUATION," which claims the priority benefit of and is a non-provisional of U.S. Provisional Application Ser. No. 62/020,787, filed on Jul. 3, 2014, entitled "SENSOR-BASED HUMAN AUTHORIZATION ASSESSMENT". The disclosure of each of the above-listed applications is hereby incorporated by reference in its entirety for all purposes.

BACKGROUND

Users attempting to access products or rights to a reservation via a website may be presented with a CAPTCHA (Completely Automated Public Turing test to tell Computers and Humans Apart) test during the process of accessing the item. Specifically, before accessing the item, the user has to successfully respond to an inquiry. However, the CAPTCHA test may cause inconvenience to the user because the test increases the time required to access the item and is often difficult to answer. Further, when the user provides responses to the inquiries of the CAPTCHA test, users may fail the test by accidentally or unintentionally providing an incorrect response to the test. Users may be blocked from accessing the item, even if the user has successfully accessed the item in the past.

In addition, with increasing frequency, human users have been assisting bot users in accessing a large portion of available resources on behalf of the bot user, thereby reducing the effectiveness of the CAPTCHA tests. For instance, CAPTCHA tests may be outsourced to countries where human users respond to the CAPTCHA inquiries on behalf of the bot user. Moreover, the result of the CAPTCHA test may not clearly indicate whether the user is a human or a bot. Lastly, if a bot user were to successfully satisfy the CAPTCHA test, the bot user would be allowed to access the item even though the bot user is unauthorized to do so.

SUMMARY

In many instances, a resource management system may need to assess whether or not a user requesting access to a resource stored in the resource management system is authorized to access the resource. For example, bot scripts can be run by a stationary computer and need not receive user input during a transaction. Further, bot scripts may be programmed to access high-demand resources on a much quicker basis than a human user, thereby preventing human users from access to the high-demand resources. The resources accessed by the bot scripts may subsequently be used in an unauthorized manner. Accordingly, exemplary embodiments of the present disclosure provide a robust detection of whether or not a user is authorized to access a resource using a sensor data associated with a user device in order to prevent access to the resource by unauthorized users.

In some embodiments, a resource-access management system for selectively granting access to resources based on sensor data obtained by sensors is provided, the system including: a user device that receives, from a user, a request to access one or more resources. The user device may be configured to include a processor that communicates with at least one sensor, the at least one sensor may detect sensor data associated with the user, and the detected sensor data may be stored on the user device. Further, the resource-access management system includes an access management system that manages an availability of the one or more resources, the access management system being configured to include: an agent characterizer. The agent characterizer may be configured to access the detected sensor data stored on the user device and access a plurality of patterns, each pattern of the plurality of patterns being a criteria for evaluating the sensor data. The plurality of patterns may include a first pattern for determining whether or an extent to which the detected sensor data corresponds to a human, and a second pattern for determining whether or an extent to which the detected sensor data corresponds to a bot user. The agent characterizer may perform a first comparison between the accessed sensor data and the first pattern and a second comparison between the accessed sensor data and the second pattern, and may compute a first score for the first comparison and a second score for the second comparison. Moreover, the agent characterizer may identify one or more additional criteria for evaluating whether the user device is authorized to access the one or more resources, evaluate information relating to the user device and the one or more additional criteria, generate an evaluation result based on the evaluated information, and compute a composite score corresponding to the user device, based on the first score, second score, and evaluation result.

In some embodiments, the resource-access management system may include a virtual test engine configured to determine whether or not to present an unauthorized user test, based on the computed composite score.

Additionally, when the composite score is equal to or less than a first threshold value, the agent characterizer may generate a first characterization result indicating that the user device is authorized to access the one or more resources. Further, when the composite score exceeds the first threshold and is equal to or less than a second threshold, the agent characterizer may generate a second characterization result indicating that additional tests are required to determine whether the user device is authorized to access the one or more resources. Moreover, when the composite score exceeds the second threshold, the agent characterizer may generate a third characterization result indicating that the user device is not authorized to access the one or more resources.

According to other embodiments, the one or more additional criteria may include a criteria for evaluating a predetermined number of previously transmitted requests to access the one or more resources. The predetermined number of previously transmitted requests may be transmitted by the user via the user device, and the criteria for evaluating the predetermined number of previously transmitted requests may evaluate a number of instances of the predetermined number of previously transmitted requests where the user device was characterized as being unauthorized to access the resources.

The one or more additional criteria may include a criteria for evaluating a predetermined number of previously transmitted requests to access the one or more resources. The predetermined number of previously transmitted requests may be transmitted by the user via the user device, and the criteria for evaluating the predetermined number of previously transmitted requests may evaluate a number of instances of the predetermined number of previously transmitted requests where the user device was characterized as being authorized to access the resources.

The one or more additional criteria may include a criteria for evaluating a geographical location of the user device based on the sensor data associated with the user.

Additionally, the agent characterizer may evaluate a geographical location of previously detected users characterized as being unauthorized to access the one or more resources. When the geographical location of the user device matches the geographical location of the previously detected users characterized as being unauthorized, the agent characterizer may generate the third characterization result indicating that the user device is not authorized to access the one or more resources.

In some embodiments, the agent characterizer may evaluate a geographical location of previously detected users characterized as being unauthorized to access the one or more resources. When the geographical location of the user device matches the geographical location of the previously detected users characterized as being unauthorized, the agent characterizer may generate the second characterization result indicating that additional tests are required to determine whether the user device is authorized to access the one or more resources.

In addition, when the agent characterizer generates the first characterization result, the virtual testing engine may determine that the unauthorized user test is not to be presented.

Further, when the agent characterizer generates the second characterization result, the virtual testing engine may determine that the unauthorized user test is to be presented.

When the agent characterizer generates the second characterization result, the virtual testing engine may determine that the unauthorized user test is to be presented.

In some embodiments, a resource management system for selectively granting access to resources may be provided, the resource management system including: a resource storage configured to store one or more items of resources; a client qualification engine configured to: receive a request to access the one or more items of the resources, the request originating for a user device operated by a user, access sensor data associated with the user operating the user device, and evaluate the sensor data to determine whether or not the user operating the user device is authorized to access the one or more items; and a queue buffer to store a plurality of requests to access the one or more items in a predetermined order. The plurality of requests may originate from a plurality of user devices, and the queue buffer may store a first request of the plurality of requests when the client qualification engine determines that the user operating the user device is authorized to access the one or more items. Further, the queue buffer may not store a second request of the plurality of requests to access the one or more items when the client qualification engine determines that the user operating the user device is not authorized to access the one or more items.

Additionally, the resource-access management system may further include a resource request controller configured to receive the request to access the one or more resources from the queue buffer, retrieve a parameter relating to the request to access the one or more resources from the resource store, and dynamically adjusting the parameter relating to the request.

In other embodiments, a resource management method for dynamically granting access to resources is provided, the resource management method including: detecting, at a resource management system, a first request to access one or more resources stored in the resource management system, the first request being transmitted by a first user operating a first user device, and the first user device being configured to include at least one first sensor detecting first sensor data associated with the first user; and accessing the sensor data associated with the first user. Further the resource management method may include evaluating whether the first user is authorized to access the one or more resources based on the sensor data associated with the first user; denying access, by the first user device, to the one or more resources when the first user is determined not to be authorized to access the one or more resources; and detecting, at the resource management system, a second request to access the one or more resources. The second request may be transmitted by a second user operating a second user device, and the second user device may be configured to include at least one second sensor detecting second sensor data associated with the second user. Further, the resource management method may include evaluating whether a first parameter of the first request corresponds to a second parameter of the second request. When the parameter of the second request corresponds to the parameter of the first request, grouping the first user and the second user, and when the first user and the second user are grouped, determining that the second user is not authorized to access the one or more resources.

In some embodiments, the parameter of the first request corresponds to a geographical location of the first user device, and the parameter of the second request corresponds to a geographical location of the second user device.

Additionally, in some embodiments, the parameter of the first request corresponds to an internet protocol (IP) address of the first user device, and the parameter of the second request corresponds to an IP address of the second user device.

In some embodiments, a method for selectively conditioning presentation of resource opportunities based on sensor data is provided, the method including: detecting, at a resource management system, a request pertaining to one or more items of resources, the request having originated at a user device operated by a user, the user device being configured to include a display and a processor that communicates with at least one sensor, the at least one sensor detecting sensor data associated with the user, the detected sensor data being stored on the user device; and receiving the sensor data stored in the user device. Further, the method may include evaluating the sensor data and generating an agent-characterization result based on the agent-characterization result, the agent-characterization result being indicative of whether or an extent to which a characteristic of the sensor data corresponds to a human-user characteristic; and determining, based on the agent-characterization result, whether an unauthorized user test is to be displayed on the display of the user device. When it is determined that the unauthorized user test is to be displayed on the display of the user device; the method may display the unauthorized user test; receive a response to the unauthorized user test; and process the response to the unauthorized user test to determine whether a satisfying criterion is satisfied. When it is determined that an unauthorized user test is not to be displayed or that the satisfying criterion is satisfied, authorizing the user operating the user device to access the one or more items of resources.

The determining of whether the unauthorized user test is to be displayed may include identifying one or more unauthorized user tests to be displayed on the display of the user device; identifying one or more test-satisfying criteria, the identification of the one or more test-satisfying criteria or the identification of the one or more unauthorized user tests being based on the sensor data; displaying the one or more unauthorized user tests; receiving one or more responses to the one or more unauthorized user tests; and processing the one or more responses to determine whether the one or more satisfying criteria are satisfied. Further, when it is determined that the one or more satisfying criteria are satisfied, an item of resource may be authorized to be electronically accessed via the user device.

In some embodiments, the identifying of the one or more unauthorized user tests is based on the sensor data and includes determining a number of unauthorized user tests to present based on the sensor data.

In some embodiments, the method may further include: processing the one or more responses and the sensor data to identify a degree of electronic access to authorize for the user device; and authorizing resources to be electronically accessed in accordance with the identified degree of electronic access via the user device.

Additionally, in some embodiments, the identifying of the one or more unauthorized user tests is based on the sensor data and includes determining a level of difficulty of the unauthorized user tests to display based on the sensor data, the level of difficulty corresponding to a difficulty level associated with a bot user successfully satisfying the unauthorized user tests.

In some embodiments, the method may further include: monitoring measurements from the at least one sensor in the user device during a period of time; and determining a template sensor-data characteristic based on the measurements.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
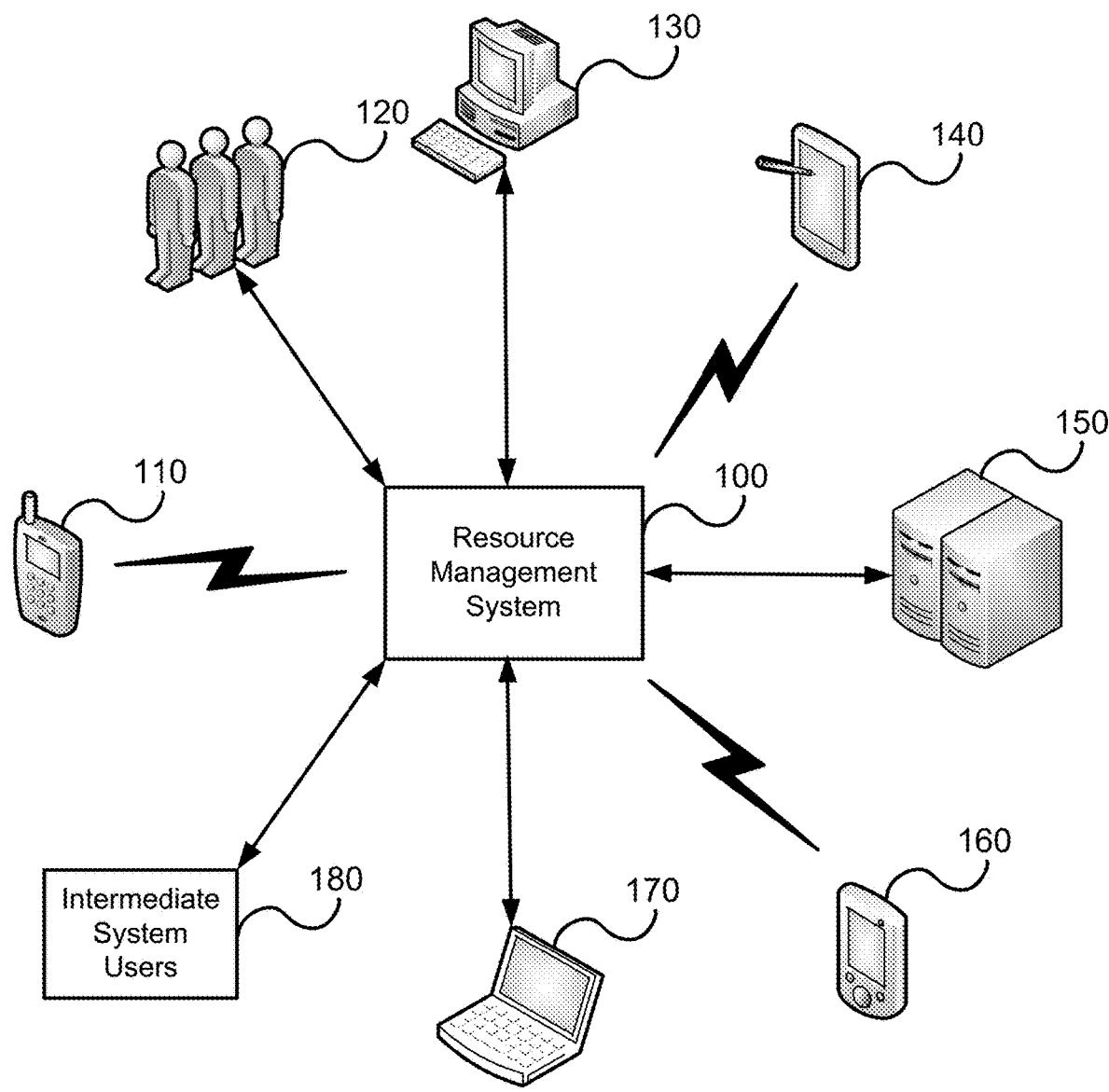
FIG. 1 depicts an embodiment of a resource management system.

Referring first to FIG. 1, an embodiment of the resource management system 100 is shown connected with various users 110, 120, 130, 140, 150, 160, 170, and 180. The various users 110, 120, 130, 140, 150, 160, 170, and 180 may each connect with the resources management system 100 in order to access an item or items of a resource controlled by the resource management system 100. Further, the resource management system 100 controls whether or not the various users 110, 120, 130, 140, 150, 160, 170, and 180 are granted access to the resources. The various users 110, 120, 130, 140, 150, 160, 170, and 180 may access the resource management system 100 using mobile apps, web sites, call centers, venue box offices, application program interfaces (APIs), etc.

Mobile phone users 110 may include users who connect with the resource management system 100 using a mobile phone. For example, mobile phone users 110 may use a smartphone to connect to the resource management system 100 via a web browser displayed on a display of the smartphone, which facilitates a webpage for accessing the item or items of the resources. In-person users 120 may connect with the resource management system 100 by visiting a box office to access the item or items. Desktop computer users 130 may use a desktop computer to connect to the resource management system 100 via a web browser, which facilitates a webpage for accessing the item or items of the resources. Tablet users 140 may use a tablet device to connect with the resource management system 100 via a web browser displayed on a display of the tablet device, which facilitates a webpage for accessing the item or items of the resources. Portable device users 160 may use portable and/or handheld electronic devices, which are configured with an Internet connection, to connect to the resource management system 100 via a browser displayed on a display of the portable electronic device, which facilitates a webpage for accessing the item of items of the resources. The portable and/or handheld electronic devices may include, for example, personal digital assistant (PDA) devices. Laptop users 170 may use laptop computers to connect to the resource management system 100 via a browser displayed on a display of the laptop computer, which facilitates a webpage for accessing the item or items of the resources. Lastly, intermediate system users 180 may include brokers, group accessors, and/or wholesale accessors who access the items in a primary environment and control access to the rights to the items in a secondary environment. For example, the intermediate system users 180 may grant access to the rights to the items accessed in the primary environment to various users 110, 120, 130, 140, 150, 160, 170, and 180 in a secondary environment. The intermediate system users 180 may connect to the resource management system 100 to access the resources using any of the means discussed above.

In some cases, bot users 150 connect to the resource management system 100 to access the resources. Bot users 150 may use a server or server farm storing software, apps or scripts that automatically access all available items of resources without the need for user input by a human. Typically, bot users 150 access or reserve the available items in an abusive manner by accessing a large portion of available items and providing rights to the reserved items to other users, thereby preventing fans (e.g. human users) from accessing the items directly from the resource management system 100. That is, bot users 150 do not access the resources in order to attend the event, whereas, fans and human users typically access the resources in order to attend the event. Further, the apps or scripts used by the bot users 150 may transmit requests to access the item or items via, for example, a webpage, at speeds not possible by human users.

Figure 2:
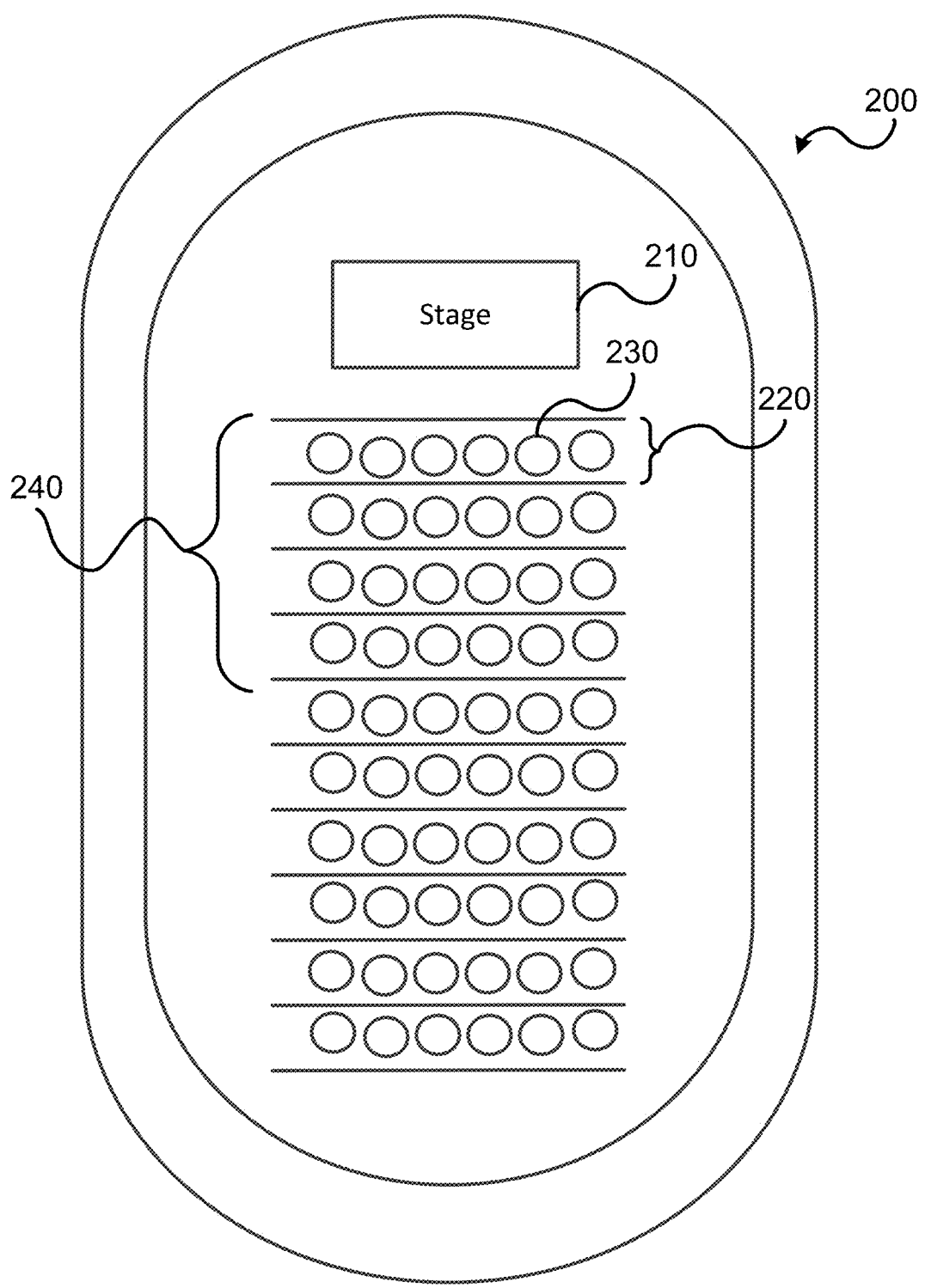
FIG. 2 is an illustration explaining a problem experienced by resource providers when allowing users to access resources.

FIG. 2 is an illustration explaining a problem experienced by resource providers when allowing users to access resources. In particular, FIG. 2 illustrates a building 200 including a main stage 210. For example, the building 200 may be a structure in which an event is hosted. As another example, the building 200 may host an on-stage performance. For example, the event may relate to sports or music. The building 200 may be any location (open air or closed) at which an event is taking place. The building 200 may also be a large lot of land where attendees stand in the direction of a main stage 210.

In addition, the building 200 may include the main stage 210 and a plurality of rows. The plurality of rows may include a first row 220, which is directly in front of the main stage 210. A first fan 230 may sit in the first row 220 at the building 200. At a given event, for example, the first section 240 may be the most popular because the first section 240 includes an area with the best view of the main stage 210.

However, bot users 150 may be programmed to access all of the available rights to sit in the first section 240. As such, the fans, such as human users, etc., may not be successful in sitting in the first section 240 because the rights to sit in the first section 240 were already reserved by the bot users 150. Bot users 150 may then provide access to sit in the first section 240 to other users in a secondary environment.

Figure 3:
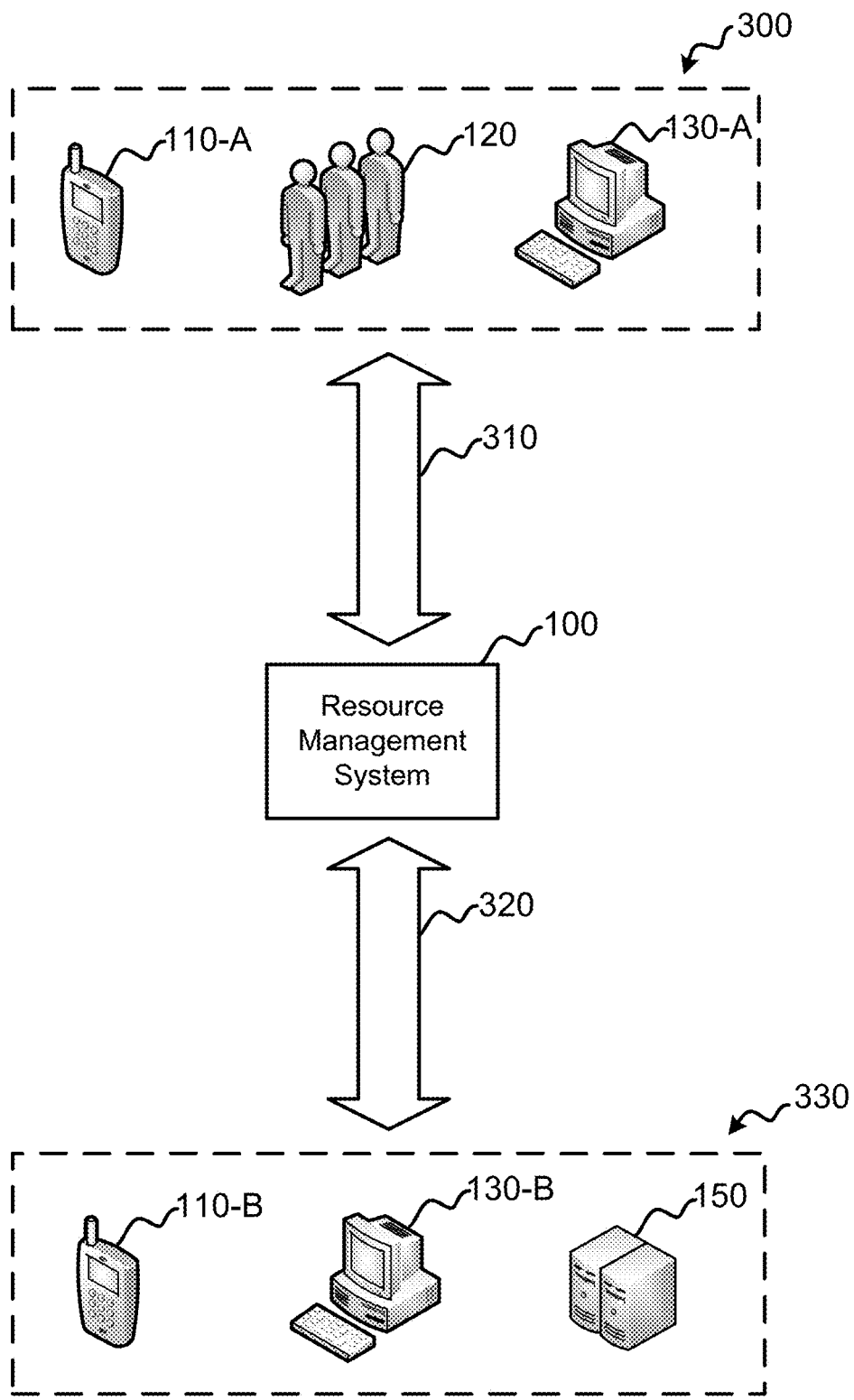
FIG. 3 illustrates levels of access to resources provided by a resource management system, according to an embodiment of the invention.

FIG. 3 illustrates different levels of access to resources provided by a resource management system 100, according to an embodiment of the invention. In order to prevent bot users from accessing resources controlled by the resource management system 100, the resource management system 100 may determine whether or not a particular user is authorized to access the resources before granting the user access to reserve the item or items of the resource. If the resource management system 100 determines that the user requesting access to resource is authorized, then the resource management system 100 may grant the user access to the resource so that the user can access or reserve the item or items of the resource.

For example, mobile phone user 110-A may transmit a request to the resource management system 100 to be granted access to the resources. The resource management system 100 may determine that the mobile phone user 110-A is authorized to access the resources, and may subsequently grant to the mobile phone user 110-A access to the resources controlled by the resource management system 100. As another example, an in-person user 120 may visit a box office and may request access to the resources controlled by the resource management system 100. The in-person user 120 may be granted access to the resource by paying the cost of the resource to the box office, and subsequently receiving rights to the resource at that time or later, and in electronic form or in paper form. Additionally, a desktop computer user 130-A may request access to the resources controlled by the resource management system 100 via a webpage displayed on a screen of the desktop computer. Upon determining that the desktop computer user 130-A is authorized to access the resources, the resource management system 100 may grant access to the desktop computer user 130-A in an electronic form (e.g., by sending an email to the desktop computer user 130-A containing a link to the access rights), or in a paper form (e.g., by sending a paper form of the access rights to the resources). Accordingly, the resource management system 100 may grant access 310 to authorized users 300 so that the authorized users 300 may access the item or items of the resources. The authorized users 300 may include mobile phone user 110-A, in-person user 120, and desktop computer user 130-A. Additionally, other users, not shown in FIG. 3, may also be authorized users. For example, any of the various users 110, 120, 130, 140, 160, 170, and 180, or other users not shown in FIG. 1, may be authorized to access to the resources.

In addition, the resource management system 100 may also determine that any of the various users 110, 120, 130, 140, 160, 170, and 180 is not authorized to access the resources. That is, the resource management system 100 may determine that a user, other than the bot user 150, is not authorized to access the resources. For example, when mobile phone user 110-B requests access to the resources, the resource management system 100 may determine that mobile phone user 110-B is associated with a bot user 150. When the resource management system 100 determines that the mobile phone user 110-B is associated with a bot user 150, the resource management system may deny the mobile phone user 110-B access to the resources. Similarly, as another example, desktop computer user 130-B may request access from the resource management system 100. The resource management system 100 may determine that the desktop computer user 130-B is associated with a bot user 150, and upon this determination, the resource management system may deny or block the desktop computer user 130-B's access to the resources. Additionally, as discussed above, the resource management system may detect that a user requesting access to the resources is a bot user 150, and accordingly, deny or block the bot user's access to the resources. Accordingly, the resource management system 100 may deny or block access 320 to unauthorized users 330 so that the unauthorized users 330 may be prevented from accessing (e.g., reserving) the item or items of the resources. The unauthorized users 330 may include mobile phone user 110-B, desktop computer user 130-B, and bot user 150. Additionally, other users, not shown in FIG. 3, may also be unauthorized users. For example, any of the various users 110, 120, 130, 140, 160, 170, and 180, or other users not shown in FIG. 1, may not be authorized to access to the resources, and thus, may be denied or blocked from access to the resources. The manner in which the resource management system 100 determines whether or not a user is authorized to access the resources is discussed in detail with the description of at least FIGS. 9, 11-12, and 15-20.

Figure 4:
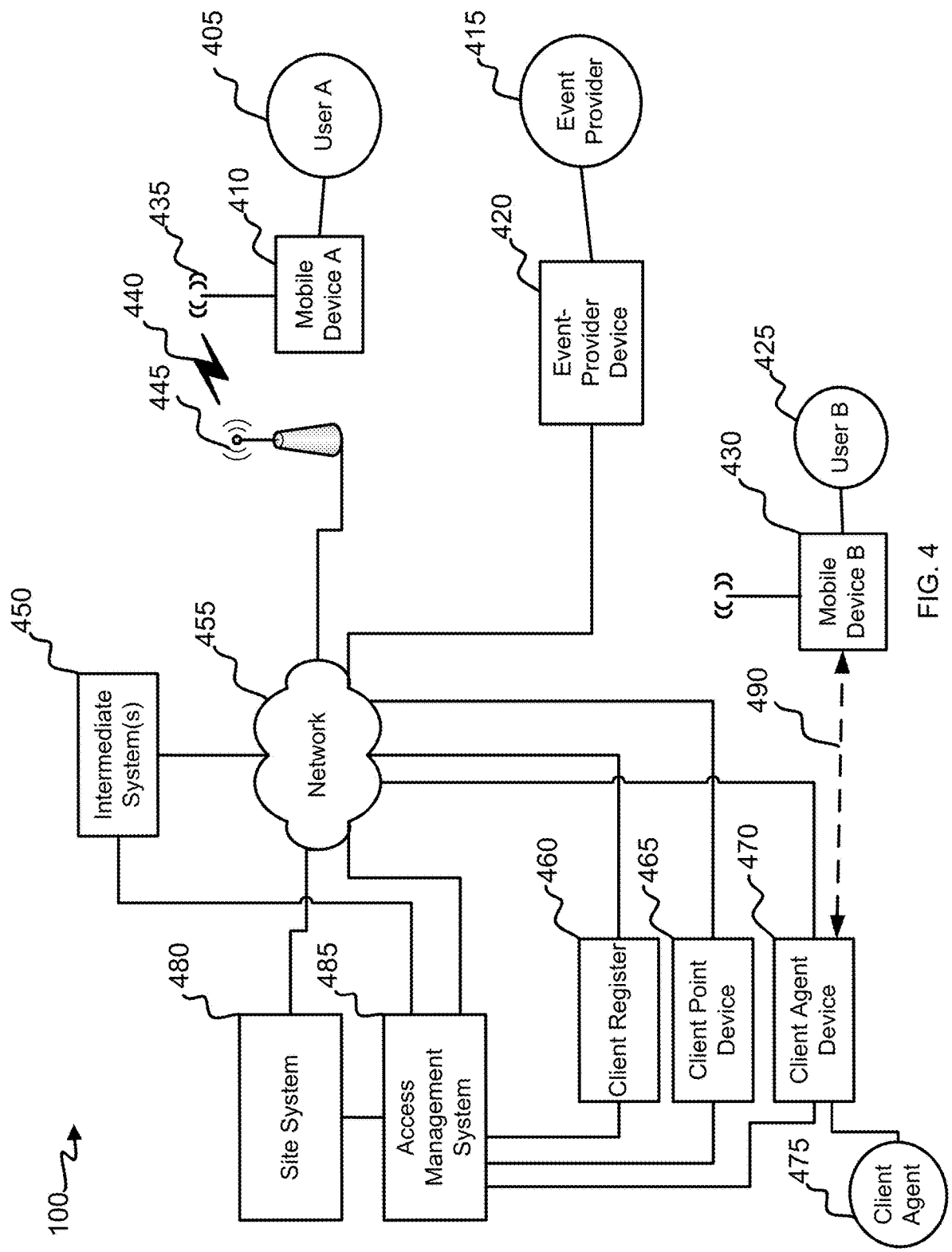
FIG. 4 depicts a block diagram of an embodiment of a resource management system, according to an embodiment of the invention.

FIG. 4 depicts a block diagram of an embodiment of a resource management system 100, according to an embodiment of the present disclosure. Mobile device A 410 (which can be operated by a user 405) and an event-provider device 420 (which can be operated, controlled, or used by an event provider 415) can communicate with an access management system 485 directly or via another system (e.g., via an intermediate system 450). Mobile device A may transmit data to access point 445, which is connected to network 455, over communication channel 440 using antennae 435. While FIG. 4 illustrates mobile device A 410 communicating with access point 445 using a wireless connection (e.g., communication channel 440), in some embodiments, mobile device A 410 may also communicate with access point 445 using a wired connection (e.g., an Ethernet connection). Mobile device A 410 can also communicate with one or more client devices, such as a client agent device 470 operated by a client agent 475, a client register 460 or a client point device 465 using a wired or wireless connection. In addition, using the access management system 485, an event provider 115 can identify an event, a parameter of attending the event, a date or dates of the event, a location or locations of the event, etc. Each inter-system communication can occur over one or more networks 455 and can facilitate transmission of a variety of types of data. It will be understood that, although only one of various systems, devices, entities and network are shown, the resource management system 100 can be extended to include multiple of any given system(s), device(s), entity(ies), and/or networks. Site system 480 is described further with the description of FIG. 10 and provides user integration services at locations associated with resources and associated access rights.

Access management system 485 can be configured to manage a dynamic set of access rights to one or more resources. More specifically, access management system 485 can track which resources are to be made available to users, specifications of the resources and times at which they will be available. Access management system 485 can also allocate access rights for resources and facilitate transmissions of notifications of the available rights to a set of user devices. For example, access management system 485 can alert users of the availability via a website, app page or email. As another example, access management system can transmit data about access rights and resources to one or more intermediate systems 450, which can facilitate distribution of access-right availability and processing of requests for such rights.

Notifications of available access rights can be accompanied by options to request that one or more access rights be assigned to a user. Therefore, user 405 can provide input to mobile device A 410 via an interface to request such assignment and provide other pertinent information. Intermediate system 450 and/or access management system 485 can process the request to ensure that the requested access right(s) remain available and that all required information has been received and, in some instances, verified. Thereafter, access management system 485 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device A 410 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 470, which can be one operated by a client agent 475 (e.g., a human client agent), a client register 460 (e.g., which can operate independently of an agent and/or can be connected to or include a device that, while in a locked mode, can impede resource access, such as a turnstile) and client point device 465 (e.g., which can operate independently of an agent and/or can be positioned at or around the resource-associated location. For example, in some instances client agent device 470 can be operated by an agent at a location for a resource that is an event ("event resource") taking place at the location. In this example, client agent device 470 is used by an agent that is manning an entrance to the location (e.g., which can include, for example, a location of a structure or a geographic region) or a part thereof; client register 460 can be or can be connected to a turnstile, gate or lockable door that is positioned along a perimeter or entrance to a resource-associated location or part thereof; and client point device 465 can be an electronic device positioned at or within a resource-associated location.

In some instances, mobile device A 410 performs particular functions upon detecting a client device and/or the contrary. For example, mobile device A 410 may locally retrieve or request (e.g., from an external source) an access-enabling code. The access-enabling code can be transmitted to the client device or a remote server (e.g., a server hosting access management system 120) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device A 410.

In some instances, user 405 can use multiple mobile devices 410 to perform various operations (e.g., using one device to request an access right and another to interact with client devices). Some instances of mobile device 410, access management system 485, intermediate system 450, client agent device 470, client register 460 and/or client point device 465 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 485. For example, a database or data store include a list of identifiers for each user or user device having an assigned access right for a resource or associating an identifier for each user or user device with an identifier of a particular access right. In some instances, an indicia can be transmitted to a user device that indicates that an access right is availed. In various instances, it may permitted or prohibited for the indicia to be transferred. The indicia may be provided as part of an electronic or physical object (e.g., a right to access an event) or independently. The indicia may include an access-enabling code.

In some instances, access management system 485 communicates with one or more intermediate systems 450, each of which may be controlled by a different entity as compared to an entity controlling access management system 485. For example, access management system 485 may assign access rights to an intermediate systems 450 (e.g., upon acceptance of terms). Intermediate system 450 can then collect data pertaining to the assigned access rights and/or a corresponding event, can format and/or edit the data, generate a notification of availability of the access rights that includes the formatted and/or edited data and facilitate presentation of the notification at a mobile device A 410. When intermediate system 450 receives a communication from the mobile device A 410 indicative of an access-right request, intermediate system 450 can facilitate assignment (or reassignment) of an access right to the user (e.g., by transmitting relevant information to access management system 485 identifying the user and/or user device and/or by transmitting relevant information to mobile device A 410 pertaining to the access right).

A resource can include one managed or provided by a client, such as a performing entity or an entity operating a venue. A mobile device A 110 can transmit data corresponding to the access right (e.g., an access-enabling code) to a client device upon, for example, detecting the client device, detecting that a location of the mobile device A 410 is within a prescribed geographical region, or detecting particular input. The receiving client device may include, for example, a client agent device 470 operated at an entrance of a defined geographical location or a client register 460 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device A 410 is, at least in part, complementary to at least part of one on access management system 485 and/or a client device; and/or such that a software agent or app on intermediate system 450 is, at least in part, complementary to at least part of one on access management system 485).

In some instances, a network in the one or more networks 455 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 455 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RCS, etc.

It will be appreciated that, while a variety of devices and systems are shown in FIG. 1, in some instances, resource management system 100 can include fewer devices and/or systems. Further, some systems and/or devices can be combined. For example, a client agent device 470 may also serve as an access management system 485 or intermediate system 450 so as to as to facilitate assignment of access rights.

As described in further detail herein, an interaction between mobile device A 110 and a client device (e.g., client agent device 470, client register 460 or client point device 165) can facilitate, for example, verification that user 405 has a valid and applicable access right, obtaining an assignment of an access right, and/or obtaining an assignment of an upgraded access right.

In addition, mobile device B 430, which is operated by user B 425, may include a user device which is located at a stadium or concert hall during an event. Mobile device B 430 may directly interact with a client device (e.g., client agent device 470, client register 460 or client point device 165), which is also located at the stadium or concert hall during the event. As such, the access management system 485 may be updated or accessed by mobile device B 430 via the client agent device 470. For example, mobile device B 430 may communicate with the client agent device 470 over a short-range communication channel 490, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short range communication link 490 is established, mobile device B 430 may communicate with the access management system 485 and access the item or items of resources. That is, while mobile device B is configured to communicate over network 455, mobile device B 430 may communicate with the access management system 485 via the client agent device 470, instead of the network 455.

Figure 5:
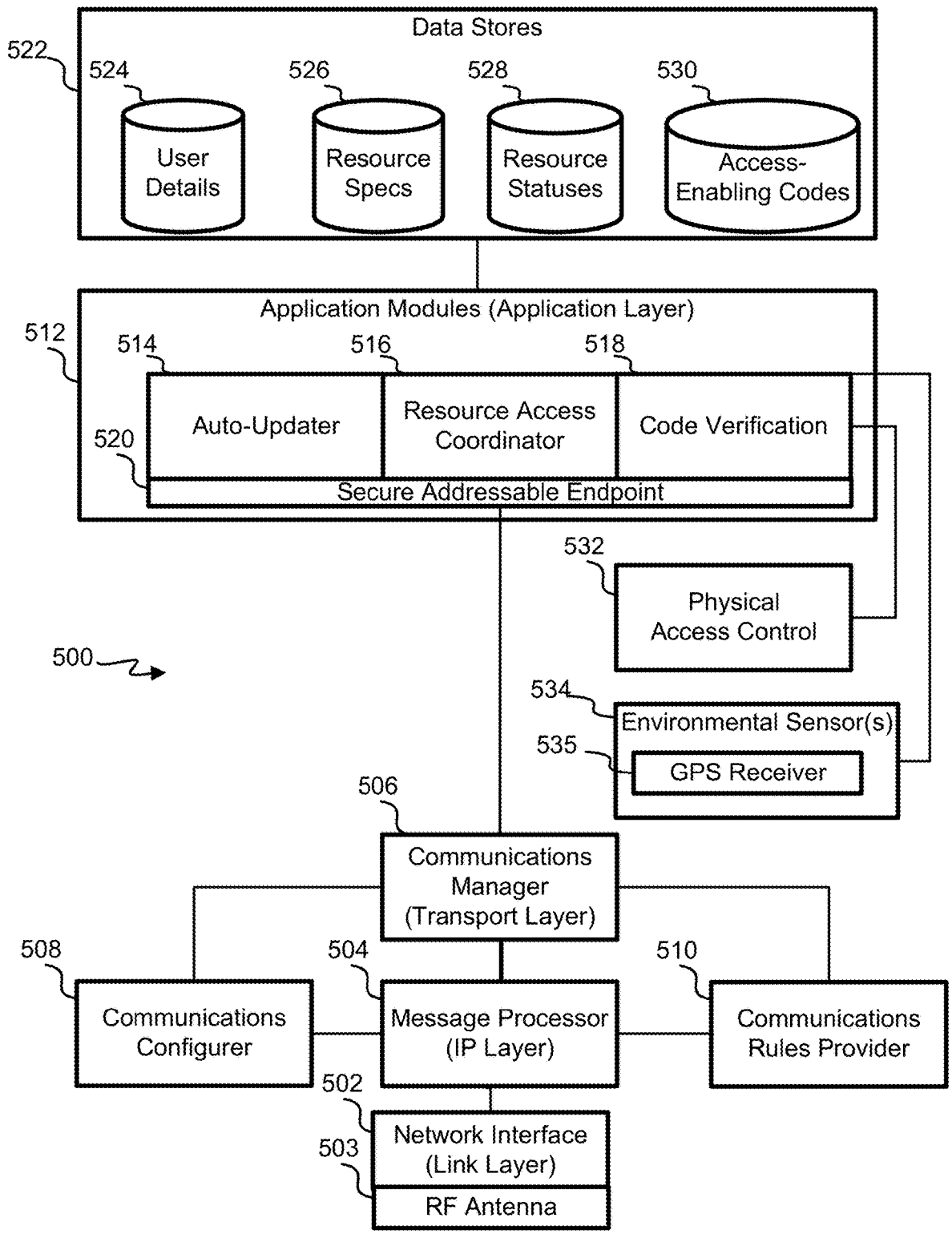
FIG. 5 illustrates example components of a device.

FIG. 5 illustrates example components of a device 500, such as a client device (e.g., client agent device 470, client register 460 and/or client point device 465), an intermediate system (e.g., intermediate system(s) 450) and/or an access management system (e.g., access management system 485) according to an embodiment of the invention.

The components can include one or more modules that can be installed on device 500. Modules can include some or all of the following: a network interface module 502 (which can operate in a link layer of a protocol stack), a message processor module 504 (which can operate in an IP layer of a protocol stack), a communications manager module 506 (which can operate in a transport layer of a protocol stack), a communications configure module 508 (which can operate in a transport and/or IP layer in a protocol stack), a communications rules provider module 510 (which can operate in a transport and/or IP layer in a protocol stack), application modules 512 (which can operate in an application layer of a protocol stack), a physical access control module 532 and one or more environmental sensors 534.

Network interface module 502 receives and transmits messages via one or more hardware components that provide a link-layer interconnect. The hardware component(s) can include, for example, RF antenna 503 or a port (e.g., Ethernet port) and supporting circuitry. In some embodiments, network interface module 502 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 503 can be configured to convert electric signals into radio and/or magnetic signals (e.g., to radio waves) to transmit to another device and/or to receive radio and/or magnetic signals and convert them to electric signals. RF antenna 503 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 502 can include one or more phase shifters, filters, attenuators, amplifiers, switches and/or other components to demodulate received signals, coordinate signal transmission and/or facilitate high-quality signal transmission and receipt.

In some instances, network interface module 502 includes a virtual network interface, so as to enable the device to utilize an intermediate device for signal transmission or reception. For example, network interface module 502 can include VPN software.

Network interface module 502 and one or more antennas 503 can be configured to transmit and receive signals over one or more connection types. For example, network interface module 202 and one or more antennas 203 can be configured to transmit and receive WiFi signals, cellular signals, Bluetooth signals, Bluetooth Low Energy (BLE) signals, Zigbee signals, or Near-Field Communication (NFC) signals.

Message processor module 504 can coordinate communication with other electronic devices or systems, such as one or more servers or a user device. In one instance, message processor module 504 is able to communicate using a plurality of protocols (e.g., any known, future and/or convenient protocol such as, but not limited to, WL, SMS, MMS, and/or email, etc.). Message processor module 504 may further optionally serialize incoming and/or outgoing messages and facilitate queuing of incoming and outgoing message traffic.

Message processor module 504 can perform functions of an IP layer in a network protocol stack. For example, in some instances, message processor module 504 can format data packets or segments, combine data packet fragments, fragment data packets and/or identify destination applications and/or device addresses. For example, message processor module 504 can defragment and analyze an incoming message to determine whether it is to be forwarded to another device and, if so, can address and fragment the message before sending it to the network interface module 502 to be transmitted. As another example, message processor module 504 can defragment and analyze an incoming message to identify a destination application that is to receive the message and can then direct the message (e.g., via a transport layer) to the application.

Communications manager module 506 can implement transport-layer functions. For example, communications manager module 506 can identify a transport protocol for an outgoing message (e.g., transmission control protocol (TCP) or user diagram protocol (UDP)) and appropriately encapsulate the message into transport protocol data units. Message processor module 504 can initiate establishment of connections between devices, monitor transmissions failures, control data transmission rates and monitoring transmission quality. As another example, communications manager module 506 can read a header of an incoming message to identify an application layer protocol to receive the message's data. The data can be separated from the header and sent to the appropriate application. Message processor module 504 can also monitor the quality of incoming messages and/or detect out of order incoming packets.

In some instances, characteristics of message-receipt or message-transmission quality can be used to identify a health status of an established communications link. In some instances, communications manager module 506 can be configured to detect signals indicating the health status of an established communications link (e.g., a periodic signal from the other device system, which if received without dropouts, indicates a healthy link).

In some instances, a communication configurer module 508 is provided to track attributes of another system so as to facilitate establishment of a communication session. In one embodiment, communication configurer module 508 further ensures that inter-device communications are conducted in accordance with the identified communication attributes and/or rules. Communication configurer module 508 can maintain an updated record of the communication attributes of one or more devices or systems. In one embodiment, communications configurer module 508 ensures that communications manager module 506 can deliver the payload provided by message processor module 504 to the destination (e.g., by ensuring that the correct protocol corresponding to the client system is used).

A communications rules provider module 510 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 316. To illustrate, a device having a short response latency may be selected as a destination device. As another example, communications rules provider 510 can maintain associations between various devices or systems and resources. Thus, messages corresponding to particular resources can be selectively transmitted to destinations having access to such resources.

A variety of application modules 512 can be configured to initiate message transmission, process incoming transmissions, facilitate selective granting of resource access, facilitate processing of requests for resource access, and/or performing other functions. In the instance depicted in FIG. 5, application modules 512 include an auto-updater module 514, a resource access coordinator module 516, and/or a code verification module 518.

Auto-updater module 514 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 500. For example, device 500 can transmit a signal to another device that identifies a particular resource, and a responsive signal can identify availabilities of access to the resource (e.g., available seat reservations for a sporting event or concert). As another example, device 500 can transmit a signal that includes an access access-enabling code, and a responsive signal can indicate whether the code is applicable for access of a particular resource and/or is valid.

In some instances, auto-updater module 514 is configured to enable the agent software to understand new, messages, commands, and/or protocols, based on a system configuration/change initiated on another device. Auto-updater module 514 may also install new or updated software to provide support and/or enhancements, based on a system configuration change detected on device 500. System configuration changes that would necessitate changes to the agent software can include, but are not limited to, a software/hardware upgrade, a security upgrade, a router configuration change, a change in security settings, etc. For example, if auto-updater module 514 determines that a communication link with another device has been lost for a pre-determined time period, auto-updater module 514 can obtain system configuration information to help re-establish the communication link. Such information may include new settings/configurations on one or more hardware devices or new or upgraded software on or connected to device 500. Thus, auto-updater module 514 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 500, auto-updater module 514 can cause a new communication link to be re-established with another device. In one embodiment, upon establishment of the communication link, system configuration information about device 500 can also be provided to another device to facilitate the connection to or downloading of software to device 500.

In one embodiment, when a poor health signal is detected by another device (e.g., when the health signal is only sporadically received but the communication link is not necessarily lost), the other device can send a command to auto-updater module 514 to instruct auto-updater module 514 to obtain system configuration information about device 500. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 506) can send specific instructions to auto-updater module 514 to specify tests or checks to be performed on device 500 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 514, etc.

Auto-updater module 514 can also receive signals identifying updates pertaining to current or future availability of resources and/or access permits. Based on the signals, auto-updater module 514 can modify, add to or delete stored data pertaining to resource availabilities, resource schedules and/or valid access permits. For example, upon receiving an update signal, auto-updater 514 can modify data stored in one or more data stores 522, such as a user detail data store 524, resource specification data store 526, resource status data store 528 and/or access-enabling code data store 530.

User details store 524 can store data for entities, such as administrators, intermediate-system agents and/or users. The user detail data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), access data (e.g., reflecting dates, parameters and/or items of past accesses) and/or other data. The user detail data can also or alternatively include technical data, such a particular entity can be associated with one or more device types, IP addresses, browser identifier and/or operating system identifier).

Resource specification data store 526 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 528 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 530 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association with rights to access a particular event can be unique relative to each other. In some instances, at least part of a code identifies a resource or specification of a resource. For example, for a right to access a concert, various portions of a code may reflect: a performing entity, resource location, date, section and access-permitted location identifier.

One or more of data stores 524, 526, 528, and 530 can be a relational data store, such that elements in one data store can be referenced within another data store. For example, resource status data store 228 can associate an identifier of a particular access right with an identifier of a particular entity. Additional information about the entity can then be retrieved by looking up the entity identifier in user detail data store 524.

Updates to data stores 524, 526, 528, and 530 facilitated and/or initiated by auto-updater module 514 can improve cross-device data consistency. Resource access coordinator module 216 can coordinate resource access by, for example, generating and distributing identifications of resource availabilities; processing requests for resource access; handling competing requests for resource access; and/or receiving and responding to resource-accessing objectives.

Figure 6:
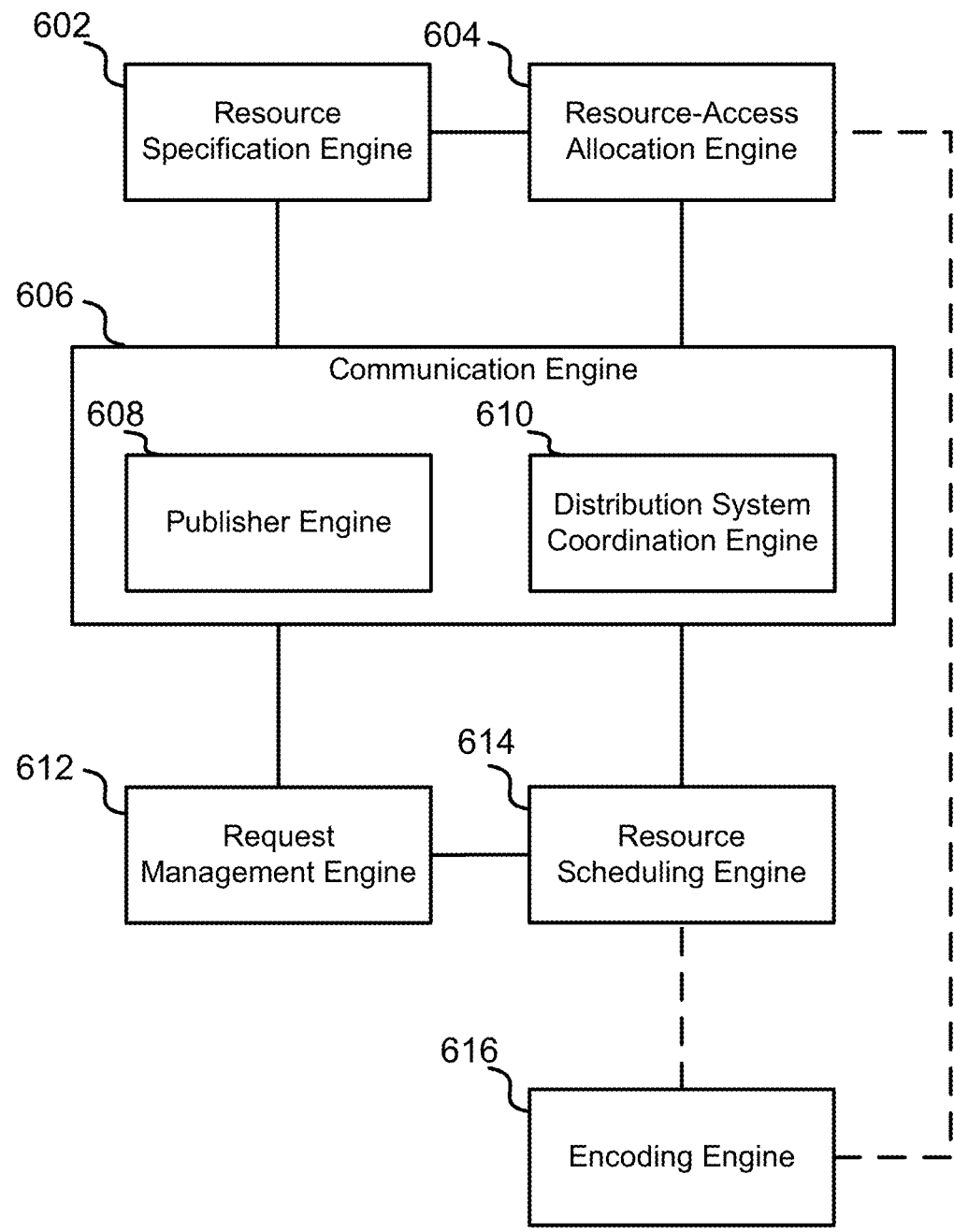
FIG. 6 illustrates example components of resource access coordinator module.

FIG. 6 illustrates example components of resource access coordinator module 516 that may operate, at least in part, at an access management system (e.g., access management system) according to an embodiment of the invention. A resource specification engine 602 can identify one or more available resources. For example, resource specification engine 602 can detect input that identifies a current or future availability of a new resource.

Resource specification engine 602 can identify one or more specifications of each of one or more resources. A specification can include an availability time period. For example, resource specification engine 602 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 602 can store the specifications in association with an identifier of the resource in resource specifications data store 526.

A resource-access allocation engine 604 can allocate access rights for individual resources. An access right can serve to provide an associated entity with the right or a priority to access a resource. Because (for example) association of an access right with an entity can, in some instances, be conditioned on authorization thereof, an allocated access right can be initially unassociated with particular entities (e.g., users). For example, an allocated right can correspond to one or more access characteristics, such as an processor identifier, a usage time, a memory allocation, and/or a geographic location (e.g., section or seat identifier). For an allocated access right, resource-access allocation engine 604 can store an identifier of the right in resource statuses data store 528 in association with an identifier for the resource and an indication that it has not yet been assigned to a particular entity.

A communication engine 606 can facilitate communicating the availability of the resource access rights to users. In some instances, a publisher engine 608 generates a presentation that identifies a resource and indicates that access rights are available. Initially or in response to user interaction with the presentation, the presentation can identify access characteristics about available access rights. The presentation can include, for example, a chart that identifies available access rights for an event. Publisher engine 608 can distribute the presentation via, for example, a website, app page, email and/or message. The presentation can be further configured to enable a user to request assignments of one or more access rights.

In some instances, an distribution system coordination engine 610 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, distribution system coordination engine 610 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, distribution system coordination engine 610 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 610 can monitor communication channels with intermediate systems to track the health and security of the channel. For example, a healthy connection can be inferred when scheduled signals are consistently received. Further, intermediate system coordination engine 610 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 608 (e.g., via a web site or app page) or via communication with an intermediate system, a request for assignment of an access right can be received. A request management engine 612 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 612 can facilitate collection of the information (e.g., via a webpage, app page or communication to an intermediate system). Request management engine 612 can also or alternatively collect predetermined information, determine that the predetermined information has been received, obtain authorization, determine that authorization has occurred (e.g., via an intermediate system), collect the predetermined information, and/or determine that the fee has been collected. For example, publisher engine 608 may receive fee parameters (e.g., credit card information) via a webpage, and request management engine 612 can request authorization for a portion of the requested access rights. In some instances, fee assessments are performed subsequent to at least temporary assignments of access rights. In some instances, request management engine 612 retrieves data from a user profile. For example, publisher engine 608 may indicate that a request for an access right has been received while a user was logged into a particular profile. Request management engine 612 may then retrieve, for example, contact information, device information, and/or preferences and/or fee information associated with the profile from user detail store 524.

In some instances, request management engine 612 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established profiles, and/or whether requests were associated with inputs indicative of a bot initiating the request (e.g., shorter inter-click intervals, failed CAPTCHA tests, access history departing from a human profile).

Upon determining that required information has been received and request-processing conditions have been met, request management engine 612 can forward appropriate request information to a resource scheduling engine 614. For a request, resource scheduling engine 614 can query resource status data store 528 to identify access rights matching parameters of the request.

In some instances, the request has an access-right specificity matching a specificity at which access rights are assigned. In some instances, the request is less specific, and resource scheduling engine 614 can then facilitate an identification of particular rights to assign. For example, request management engine 612 can facilitate a communication exchange by which access right characteristics matching the request are identified, and a user is allowed to select particular rights. As another example, request management engine 612 can itself select from amongst matching access rights based on a defined criterion (e.g., best summed or averaged access-right ranking, pseudo-random selection, or a selection technique identified based on user input).

Upon identifying appropriately specific access rights, resource scheduling engine 614 can update resource status data store 528 so as to place the access right(s) on hold (e.g., while obtaining fee authorization and/or user confirmation) and/or to change a status of the access right(s) to indicate that they have been assigned (e.g., immediately, upon receiving fee authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 616 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, an access-right document with a barcode may be transmitted to a user device, or an app on the user device can transmit a request with a device identifier for a dynamic code.

Encoding engine 616 can store the access-enabling codes in access-enabling code data store 530. Encoding engine 616 can also or alternatively store an indication in user detail data store 524 that the access right(s) have been assigned to the user. It will again be appreciated that data stores 524, 526, 528, and 530 can be relational and/or linked, such that, for example, an identification of an assignment can be used to identify one or more access rights, associated access-enabling code(s) and/or resource specifications.

Resource scheduling engine 614 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 6 depicts components of resource access coordinator engine 516 that may be present on an access management system 485, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 5, code verification module 518 (e.g., at a user device or client device) can analyze data to determine whether an access-enabling code is generally valid and/or valid for a particular circumstance. The access-enabling code can include one that is received at or detected by device 500. The analysis can include, for example, determining whether all or part of the access-enabling code matches one stored in access-enabling code data store 530 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 530 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user details, and code verification module 518 can determine whether the code-identified device or details matches that detected as part of the evaluation. To illustrate, device 500 can be a client device that electronically receives a communication with an access-enabling code from a user device. The communication can further include a device identifier that identifies, for example, that the user device is a particular type of smartphone. Code verification module 518 can then determine whether device-identifying information in the code is consistent with the identified type of smartphone.

As yet another example, code verification module 518 can identify a code format rule that specifies a format that valid codes are to have. To illustrate, the code format rule may identify a number of elements that are to be included in the code or a pattern that is to be present in the code. Code verification module 518 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 530. For example, a code that has been verified can be removed from the data store or associated with a new status. This modification may limit attempts to use a same code multiple times for resource access.

A combination of modules 514, 516, 518 comprise a secure addressable endpoint agent 520 that acts as an adapter and enables cross-device interfacing in a secure and reliable fashion so as to facilitate allocation of access-enabling codes and coordinate resource access. Secure addressable endpoint agent 520 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 506 on the receiving device can then monitors the health signal provided by the agent to ensure that the communication link between the host server and device 500 is still operational.

In some instances, device 500 can include (or can be in communication with) a physical access control 532. Physical access control 532 can include a gating component that can be configured to provide a physical barrier towards accessing a resource. For example, physical access control 532 can include a turnstile or a packaging lock.

Physical access control 532 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 532 can switch its mode in response to receiving particular results from code verification module 518. For example, upon receiving an indication that a code has been verified, physical access control 532 can switch from a locked mode to an unlocked mode. It may remain in the changed state for a defined period of time or until an action or event is detected (e.g., rotation of an arm).

Device 500 can also include one or more environmental sensors 534. Measurements from the sensor can processed by one or more application modules. Environmental sensor(s) 534 can include a global positioning system (GPS) receiver 535 that can receive signals from one or more GPS satellites. A GPS chipset can use the signals to estimate a location of device 500 (e.g., a longitude and latitude of device 500). The estimated location can be used to identify a particular resource (e.g., one being accessed at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 534 can include one or more additional or alternative sensors aside from GPS receiver 535. For example, a location of device 500 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or nonvolatile media) can be used to store program code for each of one or more of the components, modules and/or engines depicted in FIGS. 5 and 6 and/or to store any or all data stores depicted or described with reference to FIGS. 5 and/or 6. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 7:
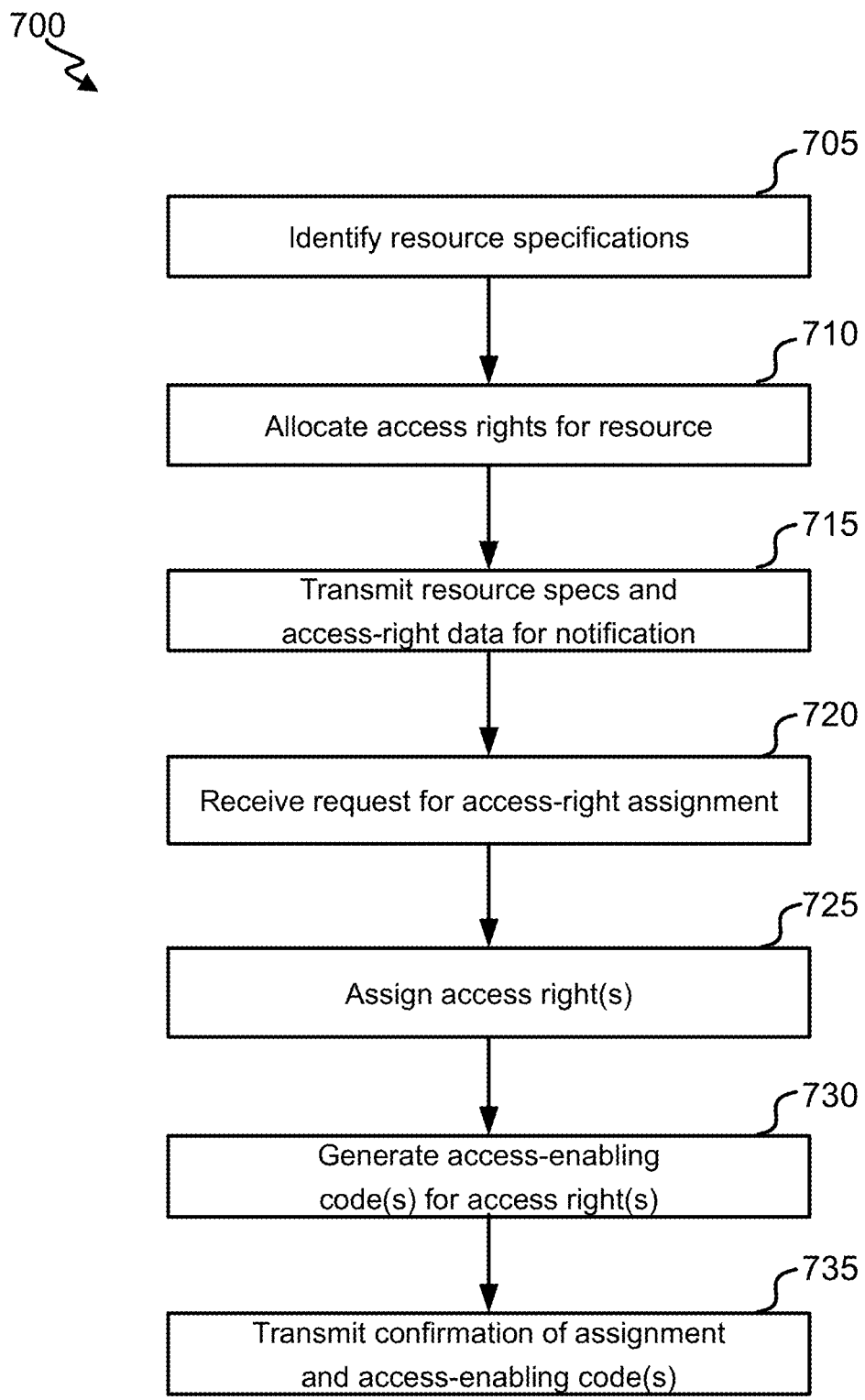
FIG. 7 illustrates a flowchart of an embodiment of a process for assigning access rights for resources.

FIG. 7 illustrates a flowchart of an embodiment of a process 700 for assigning access rights for resources. Process 700 can be performed by an access management system, such as access management system 485. Process 700 begins at block 705 where resource specification engine 602 identifies one or more specifications for a resource. The specifications can include, for example, a time at which the resource is to be available, a location of the resource, a capacity of the resources and/or one or more entities (e.g., performing entities) associated with the resource.

At block 710, resource-access allocation engine 604 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 715, communication engine 606 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 720, request management engine 612 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 725, resource scheduling engine 614 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease accessing the access rights.

At block 730, encoding engine 616 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 730 can be repeated at various time points).

At block 735, communication engine 606 transmits a confirmation of the assignment and the access-enabling code(s) in one or more transmissions. The transmission(s) may be sent to one or more devices, such as a user device having initiated the request from block 720, a remote server or an intermediate system having relayed the request from block 720.

Figure 8:
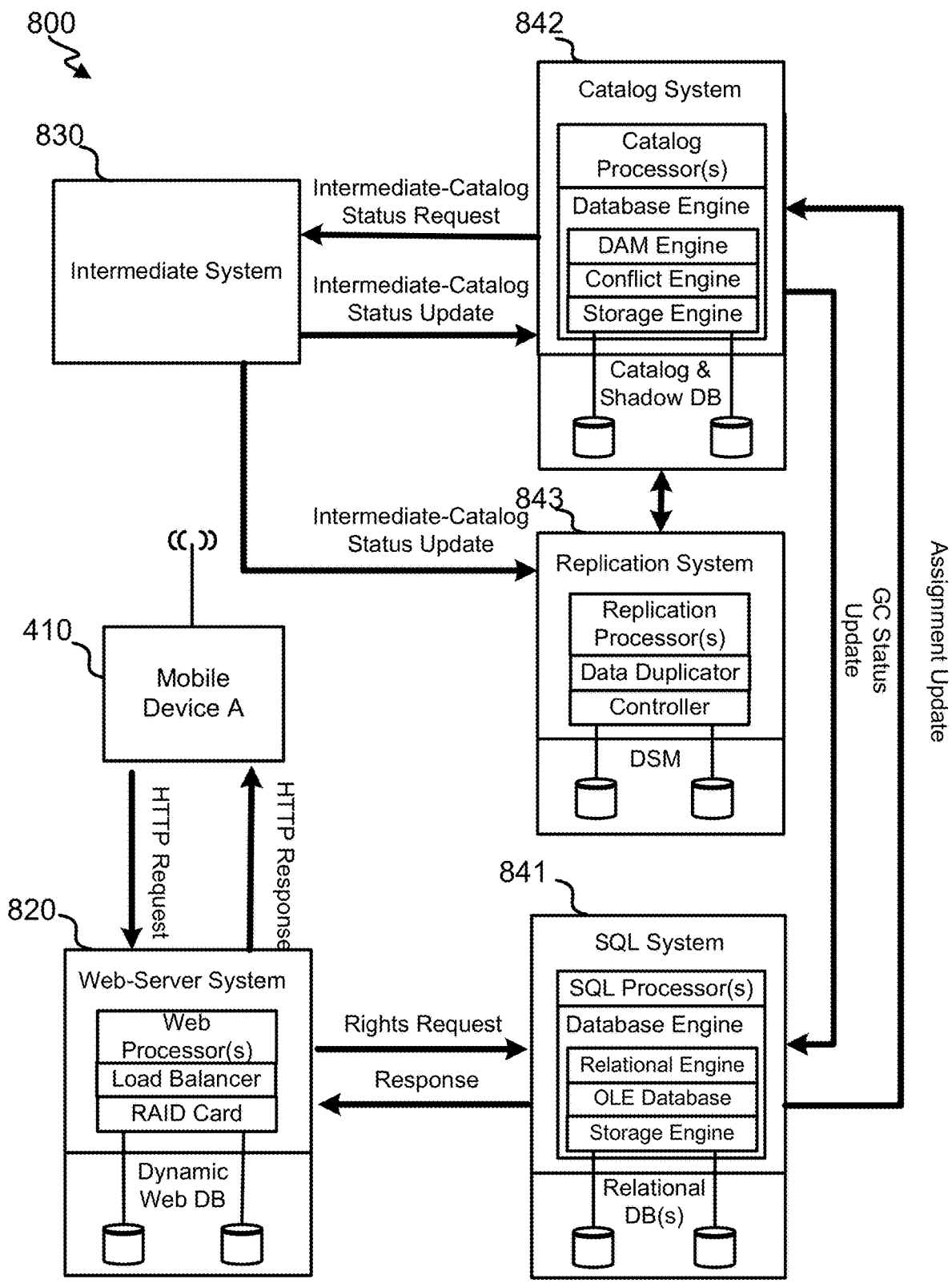
FIG. 8 shows an illustration of a communication exchange between components involved in a resource access-facilitating interaction system according to an embodiment of the invention.

FIG. 8 shows an illustration of a communication exchange between components involved in a resource management system 800 according to an embodiment of the invention. For example, mobile device A 410 can send one or more HTTP requests to a web-server system 820, and web-server system 820 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 820 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 820 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 820 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 820 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 820 can request the information from another server, such as an SQL system 841 (e.g., which may include one or more servers or one or more server farms).

SQL system 841 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 841 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 841 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user detail data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 842 that monitors and tracks statuses of resource access rights. Catalog system 842 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, details and/or user device associated with an access-right assignment; a time that the assignment was made; and/or a parameter associated with the assignment.

In some instances, a status update is less explicit. For example, a communication may identify an access right and/or resource and request a final authorization of an assignment of the access right. Catalog system 842 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 842 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 842 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 842 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), resource management system 800 can be configured such that the authoritative data store is controlling.

Resource management system 800 can further include a replication system 843. Replication system 843 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 820 can interact with mobile device A 410 to identify available access rights and to collect information needed to assign an access right. Web-server system 820 can interact with SQL system 841 so as to retrieve data about particular resources and/or access rights so as to configure web data (e.g., via dynamic webpages or scripts) to reflect accurate or semi-accurate information and/or statuses. SQL system 841 can use relational data stores to quickly provide such data. Meanwhile, catalog system 842 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 841. Catalog system 842 may provide condensed status updates (e.g., reflecting a binary indication as to whether an access right is available) to SQL system 841 periodically, at triggered times and/or in response to a request from the SQL system. A replication system 843 can further ensure that data is replicated at multiple data stores, so as to improve a reliability and speed of system 300.

It will be appreciated that various parts of resource management system 800 can be geographically separated. For example, each of mobile device A 410, intermediate system 830, web-server system 820, SQL system 841, catalog system 842 and replication 843 may be located in different geographic locations (e.g., different cities, states or countries).

Figure 9:
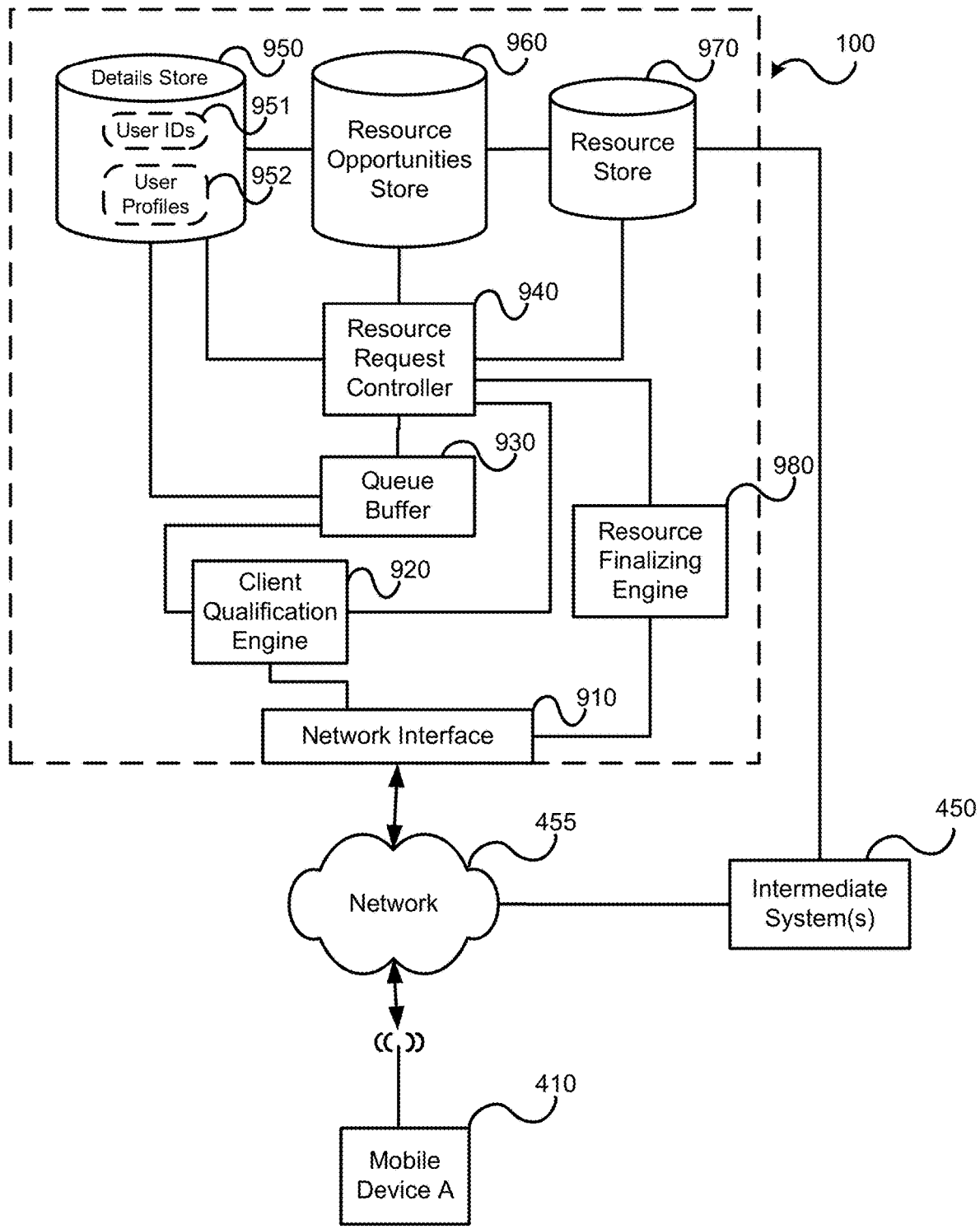
FIG. 9 illustrates example components of a resource management system according to an embodiment of the invention.

FIG. 9 illustrates example components of resource management system 100 according to an embodiment of the invention. Resource management system 100 may be, in part or in its entirety, in a cloud-based network. In some embodiments, at least part of the resource management system 100 is present on a device, such as the mobile device A 110 and/or event-provider device 420. For example, a client qualification engine 920 (described further below) may be on mobile device A 410, and a resource request controller may be in a cloud. In some embodiments, part of a component (e.g., part of client qualification engine 920) resides in a cloud and another part of the component resides in a device, such as mobile device A 410. Thus, resource management system 100 may include a distributed system.

In FIG. 9, intermediate system(s) 450 interfaces with the resource store 970 of the resource management system 100. As such, the intermediate system(s) 450 may update the resource store, which is described in more detail below, when a resource is accessed (e.g., reserved) using the intermediate system(s) 450. Further, mobile device A 410 may communicate with one or both of the intermediate system(s) 450 and the resource management system 100 via network 455.

The resource management system 100 may include a network interface 910 for connecting the resource management system 100 to network 455 and other systems (not shown). For example, the network interface 910 may translate system or computer data of the resource management system into network signals, which are transmitted over network 455. The network signals, which are converted from the system of computer data of the resource management system, are compatible with the network devices, thereby facilitating reliable exchange of data over network 455. Additionally, the network interface 910 may convert network signals, which are received at the network interface 910, into system or computer data compatible with the resource management system 100.

A client qualification engine 920 determines whether or not to grant access to the resources to the user corresponding to the received request. In some embodiments, the client qualification engine 920 may analyze information contained in the request or with the request to determine whether the user or user device (from which the received request originated) is authorized to access the resources. For example, the client qualification engine 920 may analyze the information contained in the request or with the request (which may include sensor data associated with the device from which the received request originated) to determine whether the user device (from which the received request originated) is a bot user 150. As an example, if the received request does not contain sensor data, then the client qualification engine 920 may determine that the user device (from which the received request originated) corresponds to a bot user 150. As such, in this case, the client qualification engine 920 transmits an indication to the resource request controller 940 to deny or block the user or user device (from which the received request originated) from accessing the requested resources. In addition, the custom qualification engine 920 may transmit an indication to the queue buffer 930 indicating that the received request (which corresponds to a bot user 150) is not to be stored in the queue buffer 930. In some embodiments, instead of denying or blocking access to the resources, the client qualification engine 920 may allow the request to be stored in the queue buffer 930, however, the client qualification engine 920 may transmit an indication to the resource request controller 940 indicating that the degree of access to the resources is to be limited. The limiting of the degree of access to the resources is further described in FIG. 19 below. In addition, when the client qualification engine 920 determines that the received request originated from an authorized user, then the client qualification engine 920 transmits the request to the queue buffer 930. Exemplary embodiments of the client qualification engine 920 will be discussed later in the present disclosure.

The queue buffer 930 may receive system or computer data from the network interface 910. For example, the queue buffer 930 may receive requests to access resources (which are transmitted by user devices, e.g., mobile device A 410), and may place the received requests in a queue so that the requests may be processed in an organized manner.

A resource request controller 940 may communicate with the queue buffer 930 and process the stored requests to access resources according to the queue established in the queue buffer 930. The processing of the request may include analyzing the requests to determine which resources are associated with the request and accessing information relating to the requested resources, which is stored in the resource store 970. Further, the resource request controller 940 may also communicate with the details store 950 to match the request (and identifying information contained in the request) with user IDs 951 and/or user profiles 952 stored in the details store 950. In addition, the resource request controller 940 may access information of resource opportunities relating to one or more items of the resources stored in the resource store 970. The resource request controller 940 may use the information stored in the resource opportunities store 960 to modify or adjust an aspect of the item of resource accessed from the resource store 970. For example, the resource request controller 940 may use information stored in the resource opportunities store 960 to reduce or increase a parameter of an item of resource stored in the resource store 970. While the resource request controller 940 is shown as a single component, it will be appreciated that it can nonetheless be composed of multiple separate sub-components.

The request received at the network interface 910 from mobile device A 410 may require a fee prior to granting access to the resource stored in the resource store 970. The resource request controller 940 may identify any required fee or finalizing requirements to resource finalizing engine 980.

After requirements for the release of the resources have been completed, as determined by the resource finalizing engine 980, the resource finalizing engine 980 may assign the rights to the user, such that the user can access and redeem the access rights and the access rights can no longer be assigned to other users. In addition, when the resource request controller 940 receives the request to access the resources from the mobile device A 410, the resource finalizing engine 980 may initially place the item or items of resources (which correspond to the received request) on hold (e.g., by changing a status of the item or items of resources in the resource store 970 from "available" or "allocated" to "hold" via the resource request controller 940). Specifically, the item or items of resources may be made unavailable for accessing by other users for a period of time (e.g., a predefined period of time). During that time, resource finalizing engine 980 may wait for the user to complete the accessing (e.g., reservation) of the item or items of resources. If the resource finalizing engine 980 indicates that accessing has been completed during the holding period, resource finalizing engine 980 assigns the item or items of resources to the user, such that the user can access the item or items of resources and other users cannot.

Figure 10:
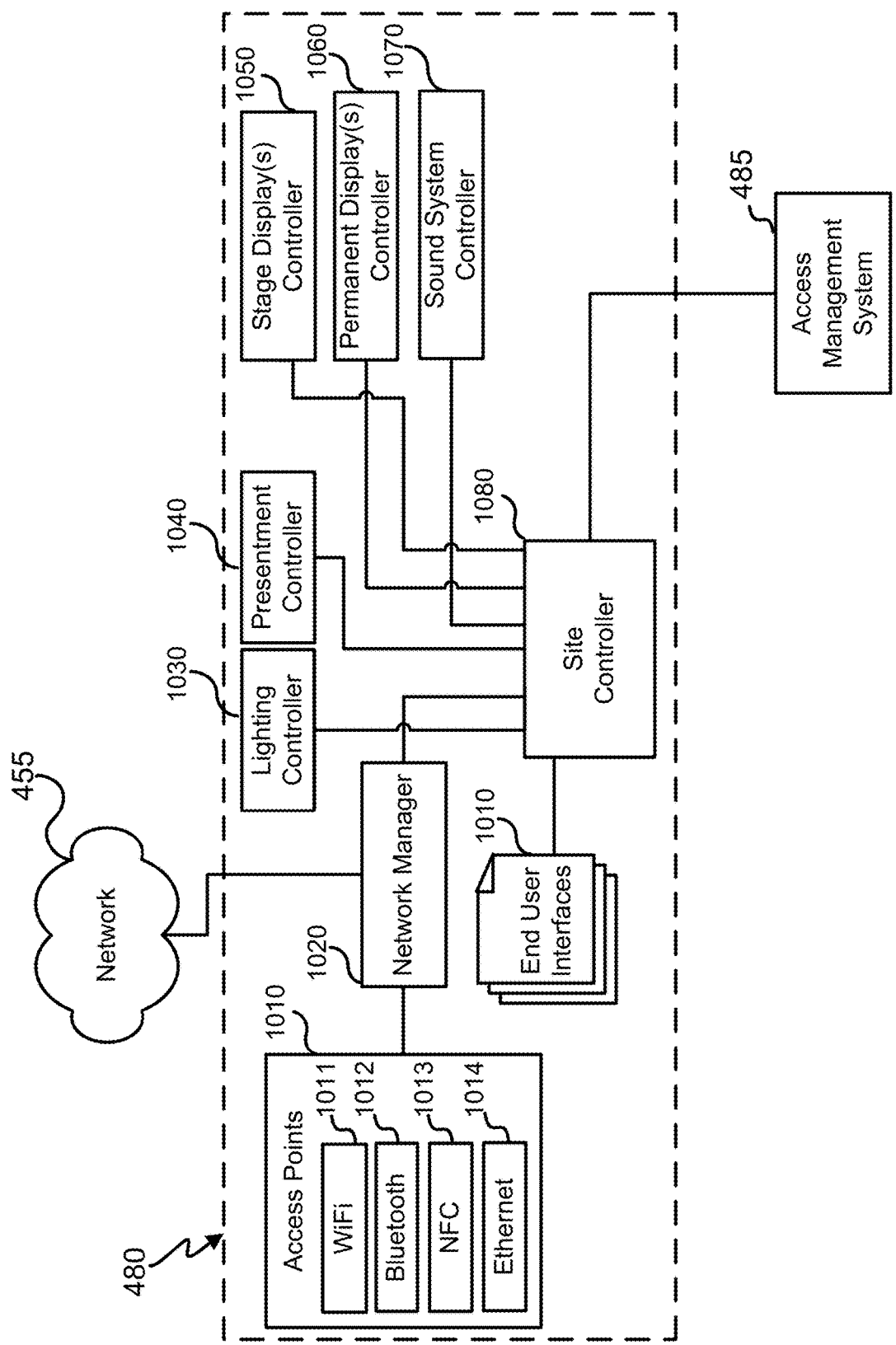
FIG. 10 illustrates example components of an embodiment of a site system.

FIG. 10 illustrates example components of an embodiment of site system 480, including connections to the access management system 485. Embodiments of site controller 1080 use network manager 1020 to connect via access points 1010 (using e.g., WiFi 1011, Bluetooth 1012, NFC 1013, Ethernet 1014, and/or other network connections), and/or via network 455, to other network components, such as the user devices. In some embodiments, site system 480 uses site controller 1080 to control aspects of an event venue. A broad variety of venue features can be controlled by different embodiments, including: permanent lights (e.g., with lighting controller 1030), stage lights (e.g., with presentment controller 1040), stage display screens (e.g., with stage display(s) controller 1050), permanent display screens (e.g., with permanent display(s) controller 1060), and the venue sound system (e.g., with the sound system controller 1070).

Figure 11:
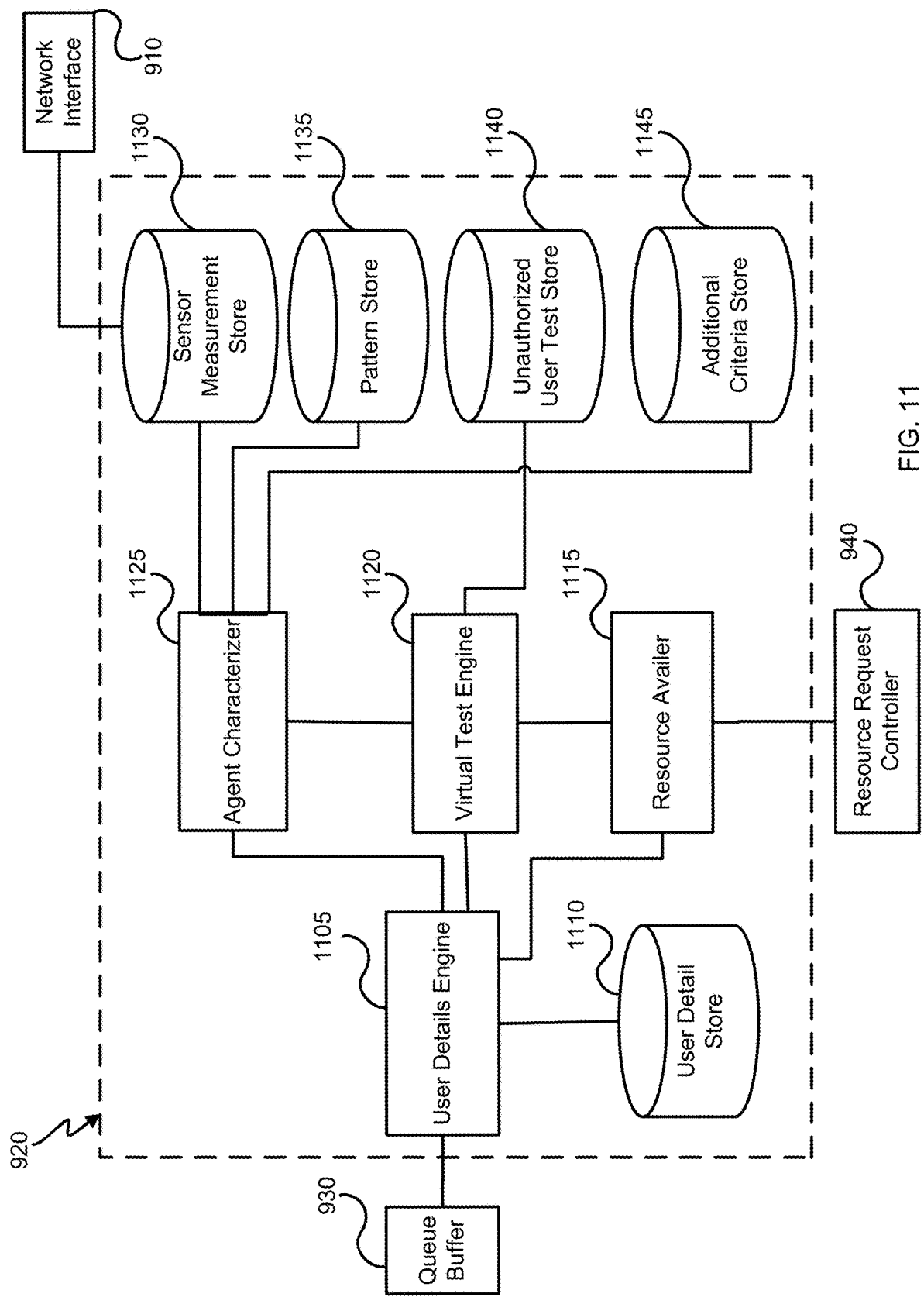
FIG. 11 illustrates example components of a client qualification engine according to an embodiment of the invention.

FIG. 11 illustrates example components of a client qualification engine 920 according to an embodiment of the invention. In some embodiments, at least part of the client qualification engine 920 is present on a device, such as a mobile device A 410 or a mobile device B 430. In some embodiments, the client qualification engine 920 may be in a cloud-based server and/or may be a part of a distributed network (e.g., across devices and/or the cloud). In other embodiments, the client qualification engine 920 may be part of a centralized network on one or more servers.

The client qualification engine 0920 may connect to the network interface 910. As such, the client qualification engine 920 may receive an input from the network interface 910 corresponding to a request to access an item or items of the resources stored in resource store 970 originating from a user 405 of a mobile device A 410. The client qualification engine 920 may include an user details engine 1105. The user details engine 1105 may generate, update and manage user details for users. Profile information associated with various users may be stored in a user detail store 1110. The profile information can include, for example, identifying information (e.g., name, address, email address, and/or phone number), preferences (e.g., preferred item types), past access details (e.g., identifying which items were previously secured (e.g., reserved), when the items were secured, parameters of the items, etc.), and/or past unauthorized user test results (e.g., identifying which unauthorized user tests were administered and when, a response to each of one or more tests and/or a score for each of one or more test). In some instances, profile information includes information about one or more user devices, such as devices used while being logged into the profile (e.g. an IP address, operating system, and/or device type).

In some instances, a user can log into a user profile by using login information, and the login allows at least some user detail data to be availed to the user and/or allows the user to reserve access rights. Thus, e.g., a user A 405 can provide a username and password, each of which is stored in as profile information. When user A 405 subsequently enters the username and password, other information from the user profile can be accessed and/or capabilities (e.g., to view an item listing or reserve an item) can be enabled. In another instance, a user profile is accessed using a device identifier, IP address, etc. Thus, e.g., user details engine 1105 may automatically detect this characteristic and store it in a profile. When user 405 subsequently accesses the resource management system 100 using the same device or IP address, the device or IP address can be matched to the appropriate profile, and other information from the profile can be accessed and/or capabilities can be enabled.

The client qualification engine 920 may further include an agent characterizer 1125, which may receive sensor data stored in the sensor measurement store 1130. The sensor data stored in the sensor measurement store corresponds to sensor measurements from each of one or more sensors in a user device, such as mobile device A 410 and/or mobile device B 430. The sensor measurements from each of one or more sensors in the user device correspond to motion data, position data, environmental data, and other sensor data associated with user A 405 and/or user B 425. For example, a sensor in the user device (e.g., mobile device A 410 and/or mobile device B 430) may include at least an accelerometer, gyroscope, GPS receiver, light detector, motion detector, camera, temperature sensors, microphone, force detector, capacitance scanner, optical scanner and/or touchscreen. The above described sensors are exemplary, and thus, the present disclosure is not limited thereto. A sensor measurement may include, for example, a magnitude or intensity, direction, signal, spatial pattern, temporal pattern, spectral characteristic and/or detection result. Sensor data associated with user A 410 can be accessed and/or processed routinely, periodically, continuously or upon detecting a trigger. For example, sensor data may be accessed and processed while an item-selling app is open or while a user is visiting a particular website. As another example, sensor data may be processed upon detecting a user request to access an item.

Agent characterizer 1125 may process the data to, e.g., calculate a statistic (e.g., for each of one or more sensors), combine sensors' measurements or statistics, evaluate a condition (e.g., to determine whether a measurement, statistic or combination value exceeds a threshold), normalize data, cluster the data (e.g., into a cluster associated with human use or with bot use), etc. The data being processed can include real-time or instantaneous data or data collected over a defined time period (e.g., over the last 24 hours). The agent character 1125 may include at least one processor to facilitate the collecting and processing of the sensor data.

In some embodiments, agent characterizer 1125 may be configured to perform biometric processing of user A 405 and/or user B 425. The biometric processing may include determining whether biometric data corresponds to human data generally (e.g., whether it is estimated that a human is present) or whether biometric data corresponds to template data from a particular person. For example, agent characterizer 1125 can receive fingerprint scan data from a fingerprint scanner and determine a degree to which the scan data matches a template. As another example, agent characterizer 1125 can receive an image from a camera, detect facial characteristics (or a face) and compare the facial characteristic (or face) to a template.

The agent characterizer 1125 can store sensor measurements and/or processed version thereof in a sensor measurement store 1130. The data can be stored in association with an identifier of a profile, user, user device, measurement time and/or other information (e.g., identification of an action preceding measurement collection, analysis or storage).

The agent characterizer 1125 can analyze the raw or processed sensor data to determine whether user A 405 and/or user B 425 corresponds to an authorized user or an unauthorized user. For example, the agent characterizer 1125 may infer whether user A 405 is a human user (e.g., a mobile phone user 110-A) or a bot user 150 by analyzing the sensor data associated with user A 405. Such analysis may include, for example, performing a classification and/or learning technique and/or evaluating a condition. A user characterization result of an analysis can include a binary result (e.g., human or not) or a non-binary result (e.g., an estimated probability that a user is a bot). If the agent characterizer 1125 determines that user A 405 is a human user, then the agent characterizer 1125 may determine that user A 405 is authorized to access the resources. However, if the agent characterizer 1125 determines that user A 405 is a bot user 150, then the agent characterizer 1125 may determine that user A 405 is not authorized to access the resources stored in the resource store 970.

In some embodiments, the analysis includes comparing sensor data (or processed versions thereof) to each of one or more templates and/or patterns stored in the pattern store 1135. In some embodiments, the templates or patterns stored in the pattern store 1135 correspond to criteria for evaluating whether the user operating the user device (e.g., user A 405 operating mobile device A 410) is an authorized user or an unauthorized user. For example, the user may be authorized to access the resources if the user is determined to be a human. Further, the user may not be authorized to access the resources if the user is determined to be a bot user 150. The agent characterizer 1125 may make the determination of whether the user is authorized or unauthorized at least in part based on the sensor data associated with the user and a comparison of the sensor data with one or more templates or patterns stored in the pattern store 1135. A template or pattern can include, for example, a template or pattern associated with a human user, a template or pattern associated with a user group, a template or pattern associated with a particular user, and/or a template or pattern associated with a bot user 150. The template can be developed during an initiation process, where, for example, a presentation can request that a user position him/herself in front of a device for a picture, scan her thumb, speak a sentence, etc. The template can also or alternatively be learned based on data collected throughout usage (by one or more users), for example, of access management system 485. For example, acceleration data collected by one or more accelerometers in a particular user device (e.g., mobile device A 410) can be used to develop a template to reflect one or more statistics such as average or minimum absolute acceleration (e.g., in a particular direction or generally) within a defined time period, or an average time interval between above-threshold acceleration or an average or minimum number of movement bouts (e.g., each associated with above-threshold acceleration) in a defined time period. The template can also or alternatively be obtained from a data store.

In an example embodiment, template comparison includes detecting one or more biometric features from sensor data associated with the user and comparing a characteristic of the biometric feature to each of one or more templates. For example, eyes can be detected in an image and an eccentricity can be identified as a characteristic. As another example, a characteristic can include a normalized power of an voice signal at a particular frequency. In some instances, a similarity score is calculated based on a comparison of sensor data (or a processed version thereof) to each of multiple templates (e.g., one corresponding to a human and another of a "bot" or one corresponding to each of multiple humans), and the comparison includes identifying a template with a highest similarity score. In some instances, a similarity score is calculated based on a comparison of sensor data (or a processed version thereof) to a single template, and the comparison include determining if the similarity score exceeds a threshold.

Based on a result of the agent-characterization analysis, a virtual test engine 1120 can determine (for example) whether or not to present an unauthorized user test to the user. In some embodiments, when the agent characterizer 1125 determines that the user (e.g., user A 405 and/or user B 425) is not a human and also determines that the user is not a bot user 150, then the virtual test engine 1120 may present additional tests (e.g., an unauthorized user test) to the user to determine whether the user is authorized or unauthorized (e.g., whether the user is a human or bot user 150) to access the resources. For example, the unauthorized user test can be administered upon a characterization of a user as being a bot, a determination that sensor data does not sufficiently correspond to a human or user template, or a determination that a probability exceeds a threshold in a particular direction.

When a test is to be administered, in some instances, virtual test engine 1120 can retrieve one or more unauthorized user tests from an unauthorized user test store 1140. The virtual test engine 1120 can use a result of the agent-characterization analysis (e.g., a result determined by the agent characterizer 1125) to determine a number, selection and/or satisfying criterion. For example, more tests, more difficult tests, more varied tests, and/or more stringent satisfying criterion may be used in response to results corresponding to or leaning towards bot characterization relative to results corresponding to or leaning towards human characterization. For example, in response to a high bot-probability result, virtual test engine 1120 may administer a visual CAPTCHA test, an audio CAPTCHA test and a mathematics question presented in an image, and virtual test engine 1120 may require that at least two of the tests be answered at least 90% correctly. Meanwhile, for a low bot-probability result, a single visual CAPTCHA test may be administered with a requirement that it be answered at least 60% correctly.

In some embodiments, a determination as to whether any tests are to be presented and/or an identification of a quantity of tests to present, which tests (or test types) to present and/or a test-satisfying criterion is also or alternatively based on other criteria aside from sensor data. For example, stricter requirements (e.g., requiring test completion, presenting more tests, presenting more difficult tests and/or using harsher satisfying criteria) may be used for users with a shorter request, accessing (e.g., reserving) history. To illustrate, a first time that a user submits a request to access the resources for an event, a user may be required to complete one or more tests. Sensor data can also be collected, which may be analyzed to determine test characteristics and/or to generate a template. Subsequently, fewer or no tests may be presented (e.g., upon determining that sensor data sufficiently matches the template or regardless). As another example, stricter requirements may be used in response to requests for a large number of resources or for requests occurring within a defined time period from a previous request (e.g., for a same event or a different event). As yet another example, a response received to a first test may influence whether another test is presented, which test is subsequently presented and/or a satisfying criterion. To illustrate, if a user correctly answers a test, a testing process may be complete, but if a user incorrectly answers a test, a second, more difficult test may be presented.

Virtual test engine 1120 can cause any selected unauthorized user test(s) to be presented to the user via a user device and can receive one or more user responses to the test(s). Virtual test engine 1120 can determine, based on the received response(s), a testing result. The testing result can include an indication as to whether a satisfying criterion is satisfied. In some instances, this determination produces a binary result—either the criterion is satisfied, or it is not. In other instances, this determination produces a non-binary result. For example, the determination can include determining an overall testing score.

Agent characterizer 1125 can use the testing result to refine the analysis inferring whether a user is authorized or unauthorized to access the resources (e.g., whether the user is a bot or a human). In some embodiments, the inference is a two-part process. A first part analyzes sensor data to determine what testing is to be administered (if any), and a second part analyzes a test result to characterize the agent. (If no test is administered, it can be inferred that the agent is a human.) In some instances, the inference is a more combined process. For example, optionally, an initial part can analyze sensor data to determine what testing is to be administered. A result of the testing can then be analyzed in combination with the sensor data to infer whether the agent is a bot. For example, a result of the characterization can included a weighted sum of an extent to which processed sensor data matched a template and a score on an administered test. In some instances, testing administered even be independent of sensor data.

Thus, through one or more of an analysis of sensor data and an analysis of testing results, agent characterizer 1125 can generate a user characterization result. An resource availer 1115 can use the user characterization result to determine what access is to be granted to a user. For example, resource availer 1115 can determine whether to allow a user to view resource details, to submit a resource query, to view results of a query, or to secure (e.g., reserve) resources. As another example, resource availer 1115 can determine which types of resources to present to a user as being available, responsive to a query or available for accessing by the user. As yet another example, resource availer 1115 can determine a parameter and/or restriction to set on the item of the resources.

To illustrate, for a user characterization result indicating that the user may be a bot, resource availer 1145 may not allow the user to access certain resources (e.g., rights to access the first section 240), may adjust resource parameter, may not allow access rights to be forwarded and may not allow the user to reserve or access more than a predetermined number of items of the resource.

In embodiments, the client qualification engine 920 may further include an additional criteria store 1145 which stores additional criteria for determining whether or not the user (e.g., user A 405) is authorized to access the resources. The additional criteria stored in the additional criteria store 1145 may or may not correspond to sensor-related criteria. For example, the additional criteria may include a number of times the user has successfully gained access to the resources in the past. That is, if the user is determined to be a bot user 150 based on the sensor data associated with the user for a current analysis, the client qualification engine 920 may access the additional criteria stored in the additional criteria store 1145 to further evaluate whether the user may still be a human user. If the user has successfully gained access to the resources over the most recent four attempts to access the resources, the agent characterizer 1125 may determine that the user (who has been determined to be a bot user 150) may still access the resources. In other embodiments, the agent characterizer 1125 may determine that the user should be presented with unauthorized user tests to further analyze if the user is a bot user 150 of a human user.

Figure 12:
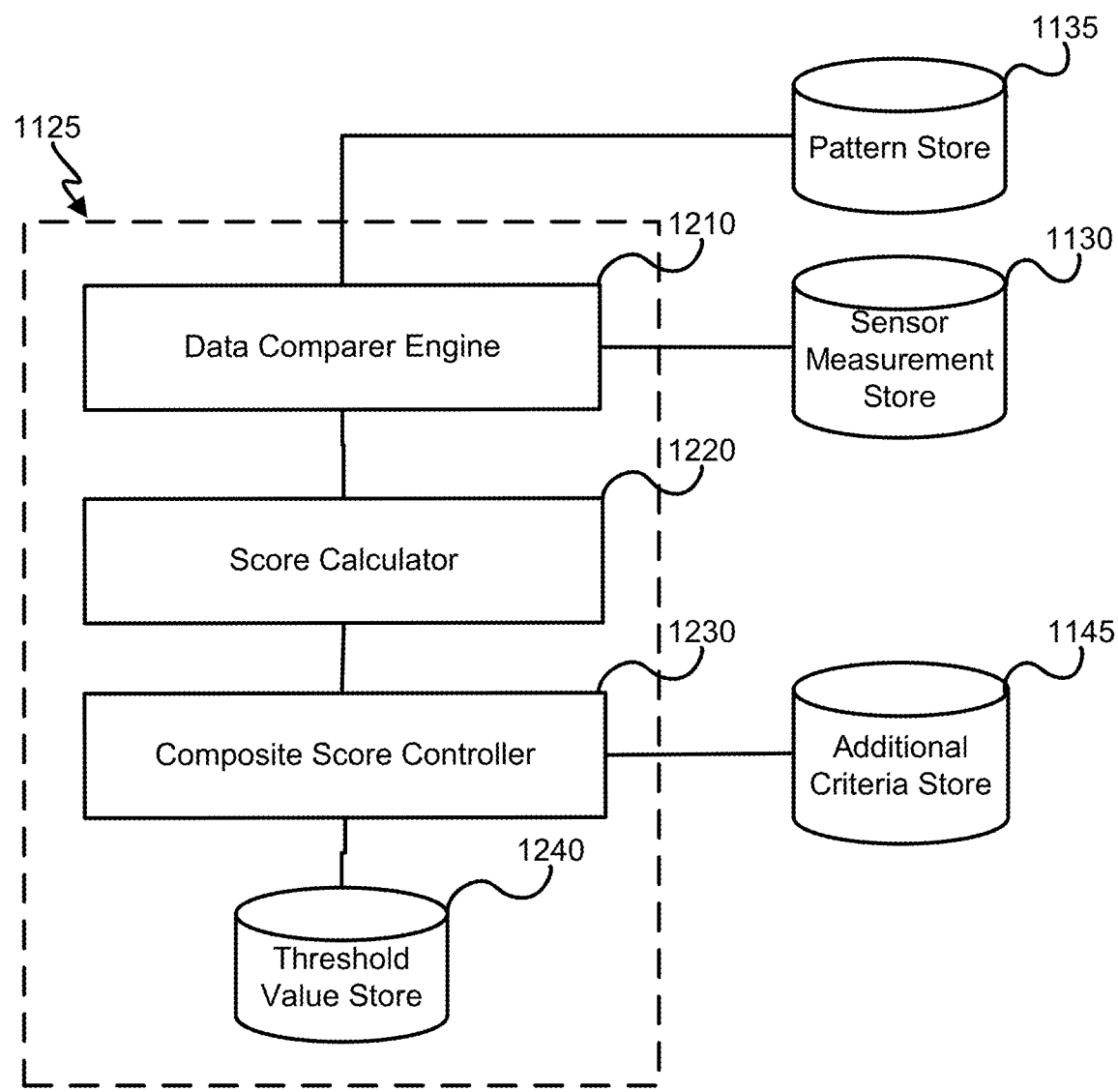
FIG. 12 illustrates example components of an agent characterizer according to an embodiment of the invention.

FIG. 12 illustrates example components of an agent characterizer according to an embodiment of the invention. The agent characterizer 1125 may include at least a data comparer engine 1210, a score calculator 1220, a composite score controller 1230, and a threshold value store 1240. Each of the data comparer engine 1210, the score calculator 1220, the composite score controller 1230, and the threshold value store 1240 may include at least one processor.

The data comparer engine 1210 may access one or more templates or patterns stored in the pattern store 1135. In addition, the data comparer engine 1210 may access sensor data associated with the user (e.g., user A 405 and/or user B 425) stored in the sensor measurement store 1130. The data comparer engine 1210 identifies at least one template or pattern stored in the pattern store 1135, and then compares each template or pattern of the identified at least one template or pattern with the accessed sensor data retrieved from the sensor measurement store 1130. The data comparer engine 1201 may also include at least one buffer to temporarily store the template or pattern and/or the sensor data. For example, the data comparer engine 1210 compares the sensor data associated with the user with a first template or pattern of the identified template or patterns. The data comparer engine 1210 individually (i.e., separately) compares the sensor data with a second template or pattern of the identified template or patterns (if a second template or pattern exists). Similarly, the data comparer engine 1210 separately compares the sensor data with a third template or patter of the identified template or patterns (if a third template or pattern exists). For example, the first template or pattern may corresponds to criteria for evaluating whether the sensor data corresponds to a human user. In this case, the first template or pattern may correspond to a criteria for determining whether the sensor data is sufficiently randomized as would be typical if a human user were operating the user device. As another example, the second template may correspond to a criteria for determining whether the sensor data corresponds to sensor data typically associated with a human touching a screen of a user device (e.g., mobile device A 410). As another example, the third template may correspond to a criteria for determining whether the sensor data exists or not. That is, if sensor data does not exist (i.e., if sensor data is not transmitted or retrieved in connection with the request to access the resources), then the agent characterizer 1125 may determine that the user device is a bot user 150 because bot users 150 run scripts or apps that do not require user input by a human. After each comparison is performed, a comparison result is generated corresponding to the comparison between the sensor data and the particular template or pattern. The above discussed templates are exemplary, and thus, the present disclosure is not limited thereto.

The score calculator 1220 may access the comparison results for each comparison (i.e., comparison of sensor data with the templates) generated by the data comparer engine 1210, and may generate a user score for each comparison result. For example, the score calculator 1220 may access a comparison result from the data comparer engine 1210 that indicates the sensor data corresponds to a bot user 150 (e.g., the comparison result may indicate that the sensor data did not exist in connection with a request to access resources originating from the user), and may generate a user score corresponding to the accessed comparison result. For example, the user score may correspond to a percentage or likelihood that the user is a bot user 150 or a human user (e.g., mobile phone user 110-A). As such, the user score for that particular comparison may correspond to a low number or a high number. In some embodiments, the user score may not correspond to a number, but rather another system for evaluating a likelihood of whether the user is a bot user 150 or not. In addition, the score calculator 1220 may generate a user score corresponding to each comparison performed by the data comparer engine 1210. Optionally, the score calculator 1220 may generate a user score corresponding to more than one comparison performed by the data comparer engine 1210. For example, in some embodiments, if the data comparer engine 1210 performed three comparisons (e.g., a first comparison of the sensor data with a first template or pattern, a second comparison of the sensor data with a second template or pattern, and a third comparison of the sensor data with a third template or pattern), then the score calculator 1220 may generate three user scores, one user score corresponding to each comparison. In other embodiments, the score calculator 1220 may generate a user score that corresponds to more than one comparison performed by the data comparer engine 1210.

The composite score controller 1230 may access the user scores generated by the score calculator 1220. In addition, the composite score controller 1230 may also access the additional criteria store 1145, and identify one or more additional criteria for evaluating whether or an extent to which a user is a bot user 150 (or alternatively, whether or an extent to which a user is a human user). For example, the additional criteria may correspond to a number of times the user (e.g., the user who is requesting access to the resources) has successfully gained access to the resources in the recent or not recent past. In some embodiments, for example, the additional criteria may correspond to an assessment of the user's (e.g., the user who is requesting access to the resources) most recent five requests to access the resources. The information corresponding to the most recent five requests to access the resources for the user may be stored in the additional criteria store 1145, the details store 950, the user details engine 1105, the user detail store 1110, and/or at another location accessible by the network 455. As an example, even though the agent characterizer 1125 may have determined that the user (e.g., user A 405) corresponds to a bot user 150 based on the analyzed sensor data, the composite score controller 1230 may determine that the user successfully gained access to the resources for each attempt of the most recent five attempts. As another example, the composite score controller 1230 may determine that the user has been classified or determined as a human user for each of the most recent five requests to access the resources. As such, in the above examples, the composite score controller generates a composite score corresponding to the user. In the above examples, the composite score may correspond to a human user, instead of a bot user 150, even though the user's current sensor data may correspond to a bot user 150.

In addition, the composite score controller 1230 may generate a composite score using the user scores calculated by the score calculator 1220 and the additional criteria accessed from the additional criteria store 1145. For example, the composite score controller may generate a composite score using a first user score (corresponding to a first comparison of the sensor data with a first template or pattern), a second user score (corresponding to a second comparison of the sensor data with a second template or pattern), and an additional criteria (accessed from the additional criteria store 1145). Further, as an example, the first user score may indicate that the user (e.g., user A 405 operating mobile device A 410) is not a human user, the second user score may indicate that the user is a bot user 150, and the additional criteria may include an assessment of how many times the user has been determined to be a human user over the most recent five attempts to access the resources. Accordingly, the composite score controller 1230 may generate a composite score based on the above that indicates that the user is a human user.

The composite score controller 1230 may determine that the generated composite score corresponding to the user indicates that the user is a human user by accessing threshold values stored in the threshold value store 1240. For example, the threshold value store 1240 may store two threshold values. The two threshold values may include a first threshold value and a second threshold value. If the composite score controller 1230 determines that the generated composite score is equal to or below the first threshold value, the composite score controller 1230 may determine that the generated composite score corresponds to a human user (e.g., a mobile phone user 110-A). If the composite score controller 1230 determines that the generated composite score is above the first threshold value but equal to or below a second threshold value, the composite score controller 1230 may determine that further testing is required. In this example, if further testing is required, the user may be presented with one or more unauthorized user tests to determine whether the user is authorized to access the resources or not. If the composite score controller 1230 determines that the generated composite score is above the first threshold value and above the second threshold value, the composite score controller 1230 may determine that the user is an unauthorized user 330. If the user is determined to be an unauthorized user 330, the user is denied or blocked from accessing the resources (i.e., denied or blocked from accessing or reserving the item or items of the resources stored in the resource store 970).

In some embodiments, for example, an additional criteria stored in the additional criteria store 1145 may include a criteria for assessing how many instances within the last five attempts to access the resources, the user requesting access to the resources has been determined to be a bot user 150. If the most recent four attempts to access the resources have resulted in the user being characterized or determined as a bot user, and if on a current fifth attempt, the user has been characterized as a human user (e.g., by the score calculator 1220), the composite score controller 1230 may determine that the user is a bot user 150. If the composite score controller 1230 determines that the user is a bot user 150, the user may be denied or blocked from accessing the resources. Optionally, in some embodiments, the user may be presented with difficult unauthorized user tests to determine whether the user is a bot user 150 or not.

Figure 13A:
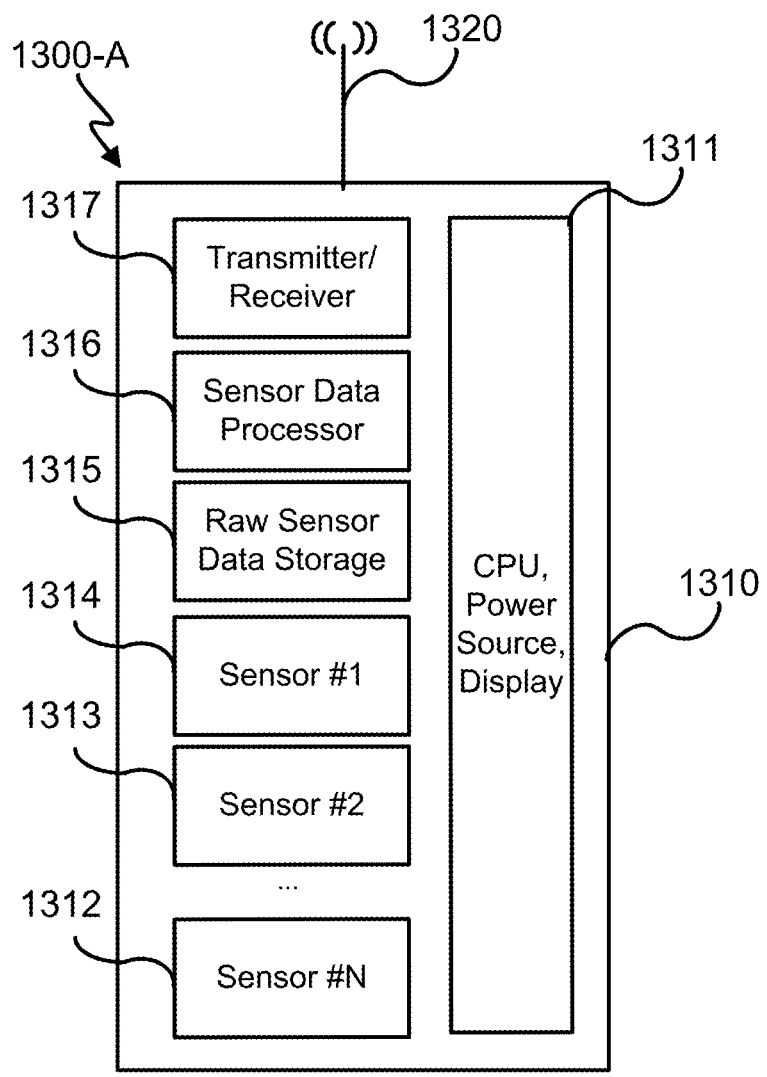
FIGS. 13A-13B illustrate example components of exemplary user devices according to embodiments of the present invention.
Figure 13B:
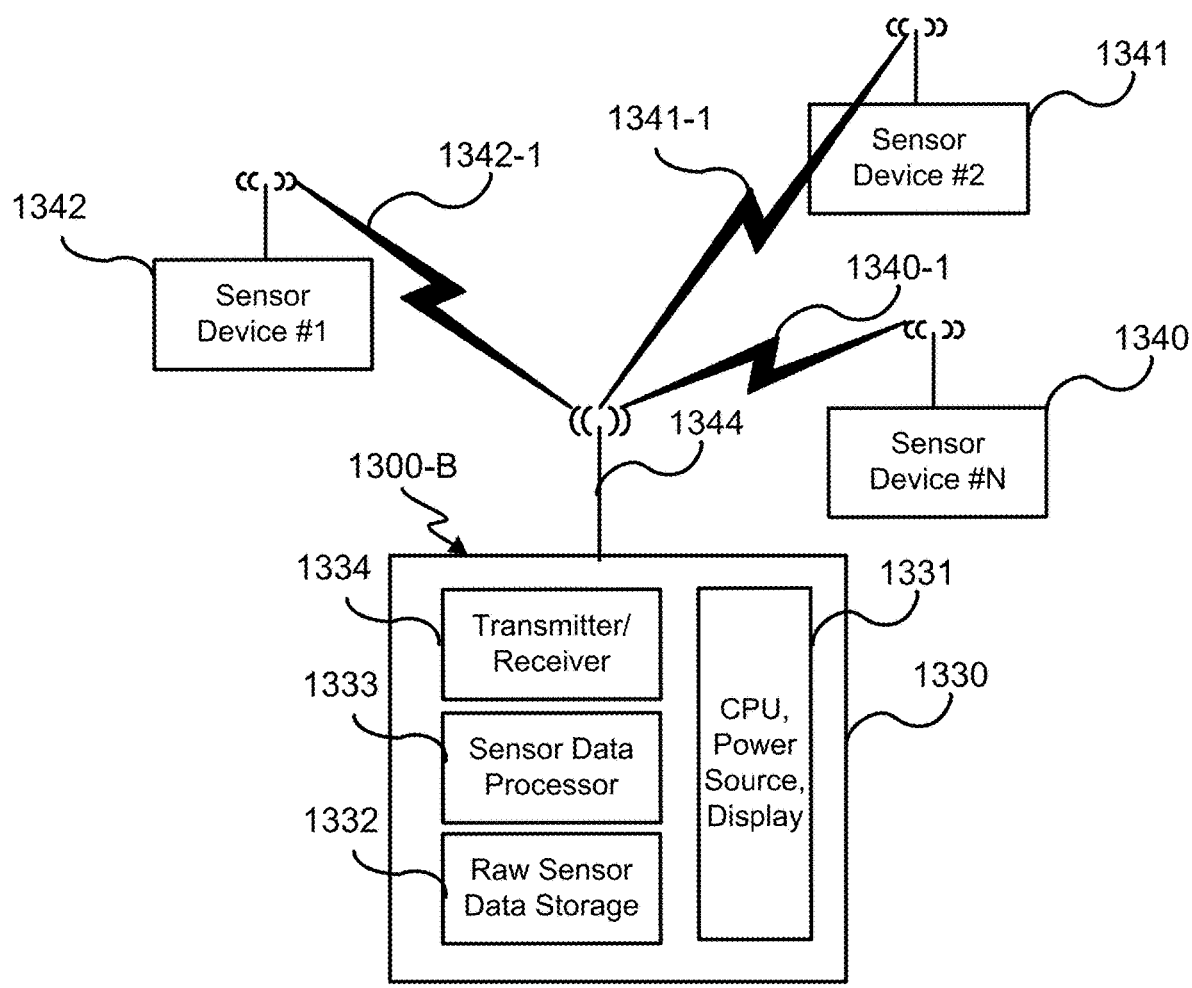

FIGS. 13A-13B illustrate example components of exemplary user devices according to embodiments of the present invention. FIG. 13A illustrates an exemplary user device 1300-A. User device 1300-A may be operated by a user (e.g., user A 405 or user B 425) and, in some embodiments, may correspond to mobile device A 410 and/or mobile device B 430. The user may operate user device 1300-A by inputting a request to access resources stored in the resource store 970 of the resource management system 100. The request may be inputted using a CPU, power source, and/or display 1311 of the user device 1300-A. The CPU, power source, and/or display 1311 may be located in a housing 1310 of the user device 1300-A. Further, the inputted request to access resources may be transmitted over network 455 to the access management system 485 to be processed. For example, the inputted request to access resources may be transmitted using the transmitter/receiver 1317 and the antenna 1320. In addition, user device 1300-A. The user device 1300-A may include sensor #1 1314, sensor #2 1313, . . . and sensor #N 1312 (N being an integer value greater than 2). That is, the user device 1300-A may include any number of sensors. The sensors 1312-1314 of the user device 1300-A may collect and store sensor data associated with the user operating the user device 1300-A. The sensor data collected by sensors 1312-1314 may also be stored in the raw sensor data storage 1315. The sensor data stored in the raw sensor data storage 1315 may be processed by the sensor data processor 1316 before being transmitted to the transmitter/receiver 1317 and the antenna 1320. FIG. 13B illustrates another example embodiment of the user device (e.g., mobile device A 410 or mobile device B 430). In FIG. 13B, user device 1300-B is similar to user device 1300-A, however, user device 1300-B uses sensor devices 1340, 1341, and 1342 to communicate with the antenna 1344 over communication channels 1340-1, 1341-1, and 1342-1, respectively. The sensor devices 1340, 1341, and 1342 may include wearable technology devices that collect and store information associated with the user operating the user device 1300-B. In addition, user device 1300-B may include a housing 1330, a CPU, power source, and/or display 1331, a raw sensor data storage 1332, a sensor data processor 1333, and a transmitter/receiver 1334. The sensor data collected by the sensors 1312-1314 and/or the sensor devices 1340-1342 (associated with the user operating the user device) may be collected and transmitted (in a processed or raw form) to the resource management system, where the client qualification engine 920 determines whether the user operating the user device 1300-A, 1300-B is authorized to access the resources based on the an analysis of the sensor data.

Figure 14:
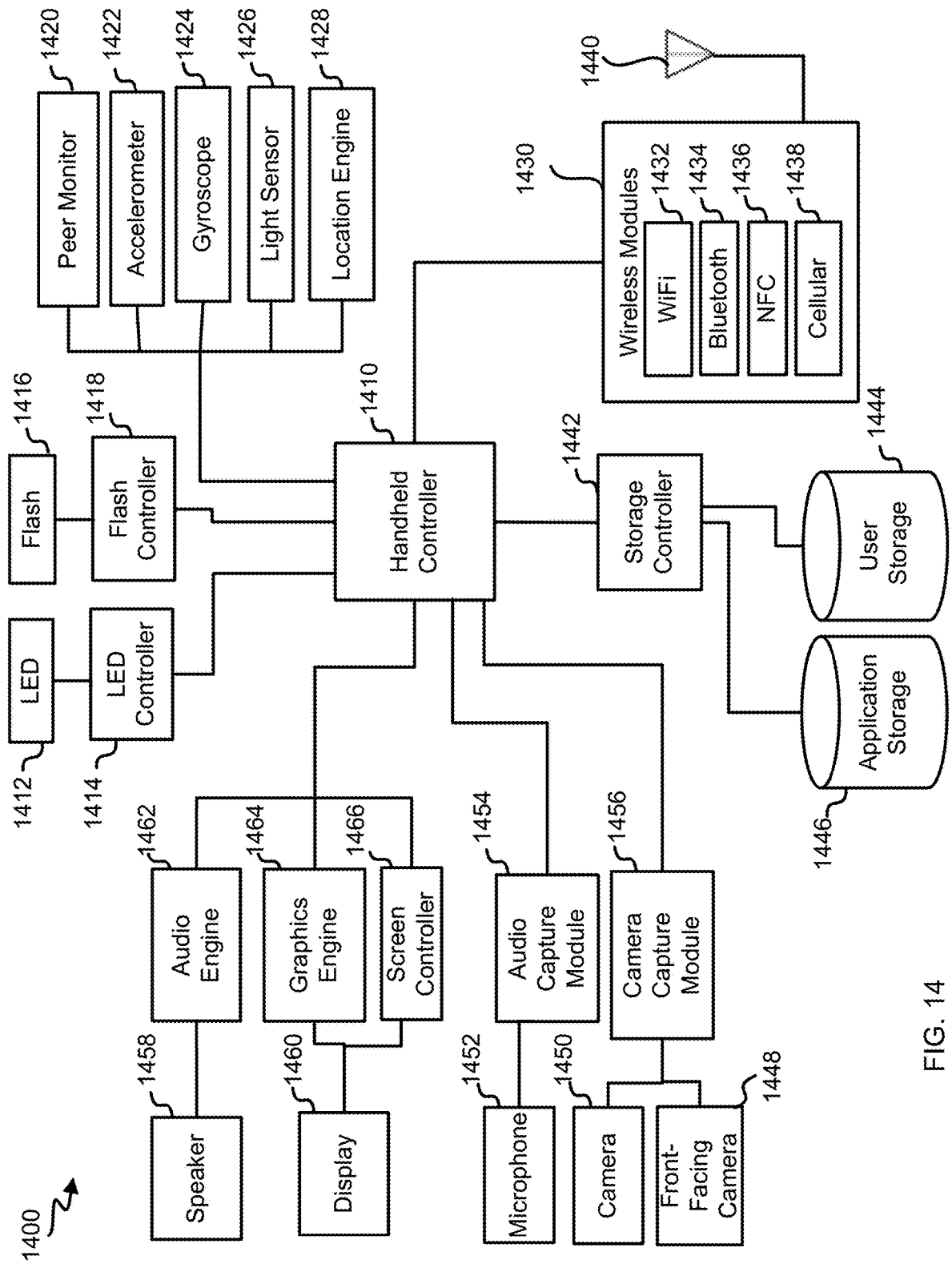
FIG. 14 illustrates example components of another exemplary user device according to embodiments of the present invention.

FIG. 14 illustrates example components of another exemplary user device 1400 according to embodiments of the present invention. FIG. 14 illustrates example components of a mobile device 1400. Mobile device 1400 may be another example embodiment of the user device (e.g., user devices 1300-A, 1300-B and mobile devices A 410, B 430). Mobile device 1400 can connect to access point 445 using one or more antennas 1440, and wireless modules 1430 (e.g., WiFi 1432, Bluetooth 1434, NFC 1436 and/or cellular 1438). Handheld controller 1410 can use input and output hardware components and/or sensors to enable different embodiments described herein.

Input sensors used by mobile device 1400 described herein include, accelerometer 1422, gyroscope 1424, and light sensor 1426. Location engine 1428 can use geolocation hardware components (e.g., wireless signal receivers, iBeacon, NFC, Global Positioning System (GPS), and/or other similar components). Peer monitor 1420 uses a data structure to stores and updates the location of nearby mobile devices 1400. In some embodiments, peer monitor 1420 receives information from site system 480 that corresponds to the locations of other nearby mobile devices. In embodiments, peer monitor can also use sensors to locate nearby mobile devices 1400 (e.g., Bluetooth 1434, NFC 1436, and or other similar sensing hardware). Other input components used by some embodiments include microphone 1452, camera 1450, and front-facing camera 1448, respectively controlled and/or providing capture by audio capture module 1454 and camera capture module 1456. One having skill in the relevant art(s), given the description herein, will appreciate that other input and or sensor components can be used by embodiments of mobile device 1400.

Output components used by some embodiments include speaker 1458, display 1460, LED 1412, and flash 1416, respectively controlled and/or relayed output information by, audio engine 1462, graphics engine 1464 and screen controller 1466, LED controller 1414, and flash controller 1418. Other output components used by mobile devices 1400 include NFC 1436 and Bluetooth 1434, which, beyond wireless communication capabilities can also be used to send instructions to certain devices.

Some embodiments described herein use information collected by mobile device 1400 using connections to site system 480. This information collected (e.g., pictures, video, recorded audio, movement data collected by gyroscope 1424 and/or accelerometer 1422, and/or other collectable data) can be stored by mobile device 1400 in user storage 1444. In addition, in some embodiments described herein, site controller 1080 can control mobile device 1400 by sending control signals to the device, and storing information in application storage 1446 (e.g., content to be displayed, hardware configuration instructions, trigger commands for hardware components, and/or other similar information). In some embodiments, handheld controller 1410 uses storage controller 1442 to store and retrieve information from application storage 1446 and user storage 1444.

One having skill in the relevant art(s), given the description herein, will appreciate that other combinations of similar components can be used to provide the features of the components described above, e.g., components described above could be replaced by components that have been combined into integrated components and/or components that have been divided into multiple components, e.g., a variation of camera 1450 can include a camera capture module 1456 as an integrated unit. Additional descriptions of example components used by mobile device 1400 is provided below.

Figure 15:
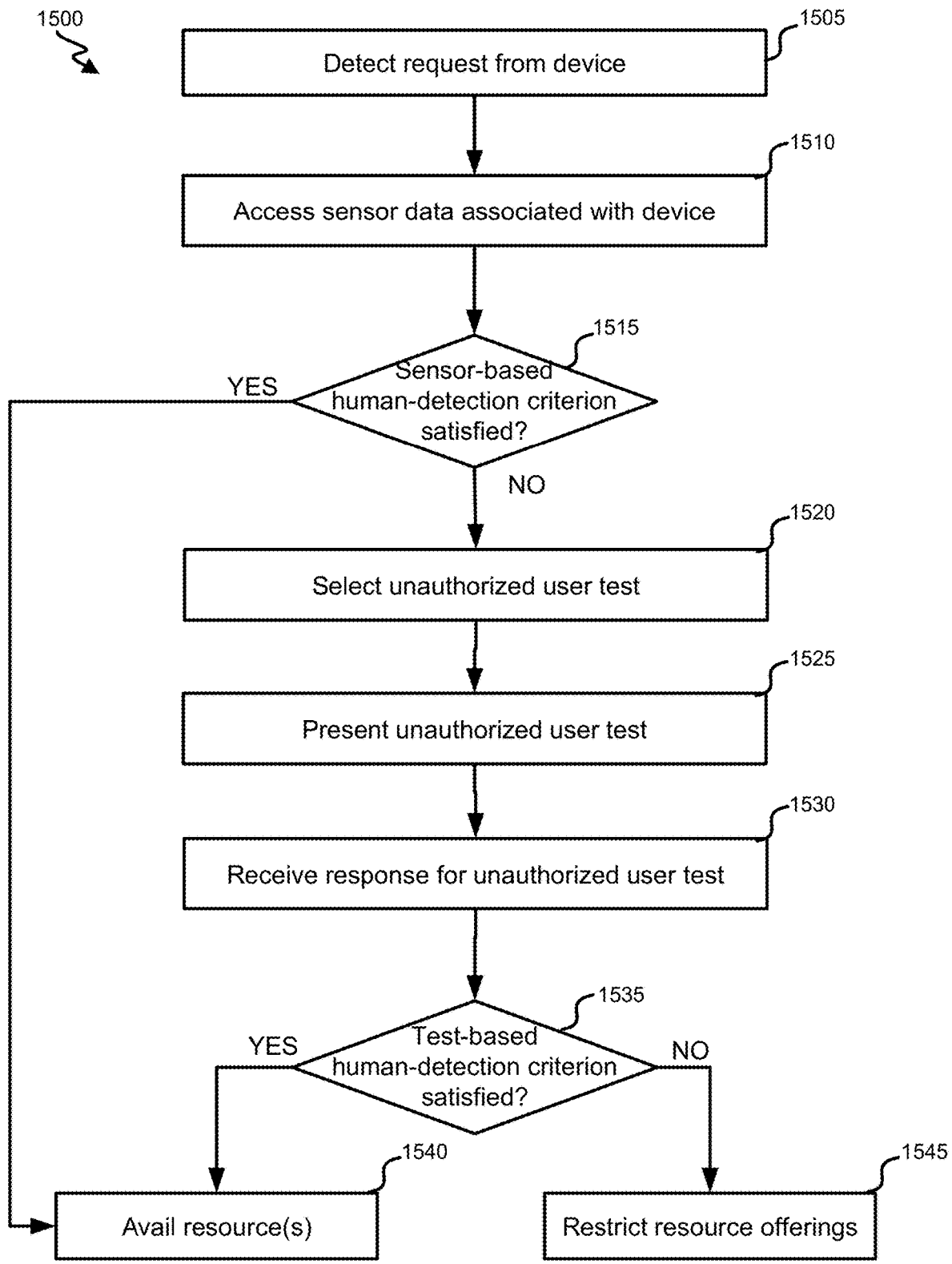
FIG. 15 is a flowchart illustrating an embodiment of a process for using sensor data to influence presentation of unauthorized user tests.

FIG. 15 illustrates a flowchart of an embodiment of a process 1500 for using sensor data to influence presentation of unauthorized user tests. Process 1500 can be performed, for example, in part or in full at a user device (e.g., mobile device A 405, mobile device B 430, user devices 1300-A, 1300-B, and 1400) or in the cloud.

At block 1505, a request (from a user device) to access resources stored in the resource store 970 of the resource management system 100 is detected. At block 1510, sensor data associated with the user operating the user device (which originated the request) is accessed. At block 1515, a determination as to whether to present unauthorized user tests can be made based on an evaluation of a sensor-based human-detection criterion. The criterion can, for example, include a threshold for a sensor-data variable, a threshold for a template-comparison score, a classification result, etc. The determination can be made using raw or processed sensor data, such as a weighted sum of sensor data, transformed sensor data, or a comparison of sensor data to template sensor data.

As block 1535, a determination can be made as to whether a test-based human-detection criterion is satisfied. The determination can be made using the received responses, comparing the received responses to correct responses, calculating a response score, comparing a response score to a threshold, comparing a response time to a threshold, comparing a number of test attempts to a threshold, etc. In some instances, the determination further depends on the sensor data. For example, a threshold response score may be set lower for instances where sensor data more closely resembles human usage relative to other instances.

When either of the conditions 1515 and/or 1535 are satisfied, process 1500 can continue to block 1540, where a resource adjustment is availed. For example, block 1540 can include allowing a user to make a reservation (e.g., corresponding to a particular resource listing or generally), allowing a user to make a reservation for a particular subset of items corresponding to an resource listing, allowing a user to make a reservation at an early time point (e.g., during an early-release time period), allowing a user to make a reservation with relatively few restrictions (e.g., allowing for higher reservation quantities), etc.

When the test-based human-detection is not satisfied, process 1500 continues to block 1545, where resources are restricted. For example, block 1545 can include not allowing a user to make a reservation (e.g., corresponding to a particular resource listing or generally), not allowing a user to make a reservation for a particular subset of items corresponding to a resource listing (e.g., high-demand items), not allowing a user to make a reservation at an early time point (e.g., during an early-release time period), not allowing a user to make a reservation at a relatively low parameter, not allowing a user to make a reservation with relatively few restrictions (e.g., allowing for higher reservation quantities), etc. When the sensor-based human detection criterion is not satisfied at condition 1515, the process 1500 proceeds to block 1520 where an unauthorized user test among a plurality of unauthorized user tests is selected. In some embodiments, for example, the unauthorized user test may correspond to a CAPTCHA test. At block 1525, the selected unauthorized user test is presented to the user. At block 1530, responses to the unauthorized user test(s) are received and processed to determine whether the responses to the unauthorized user test(s) satisfies the test-best human-detection criterion at condition 1535.

Figure 16A:
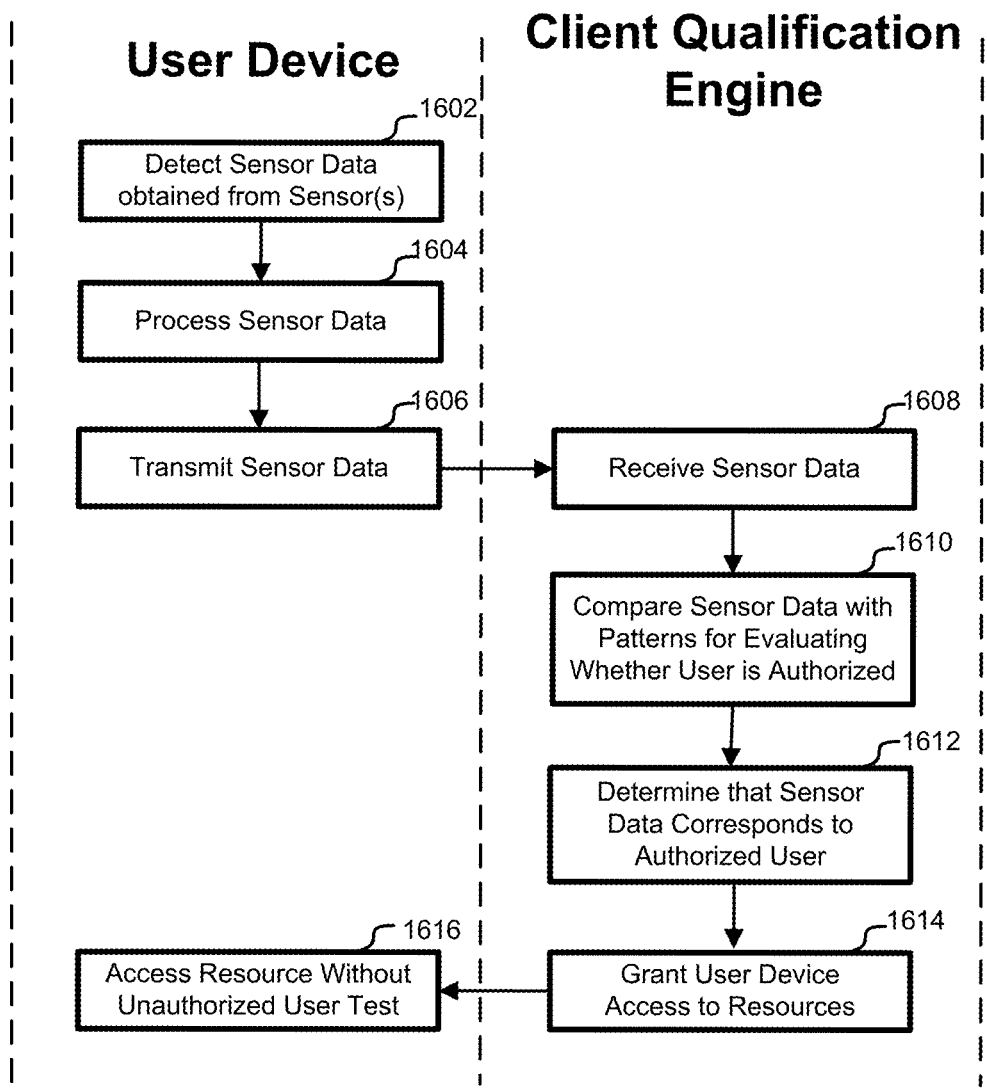
FIGS. 16A-16C are swim lane diagrams illustrating an embodiment of a process for using sensor data to influence presentation of unauthorized user tests.
Figure 16B:
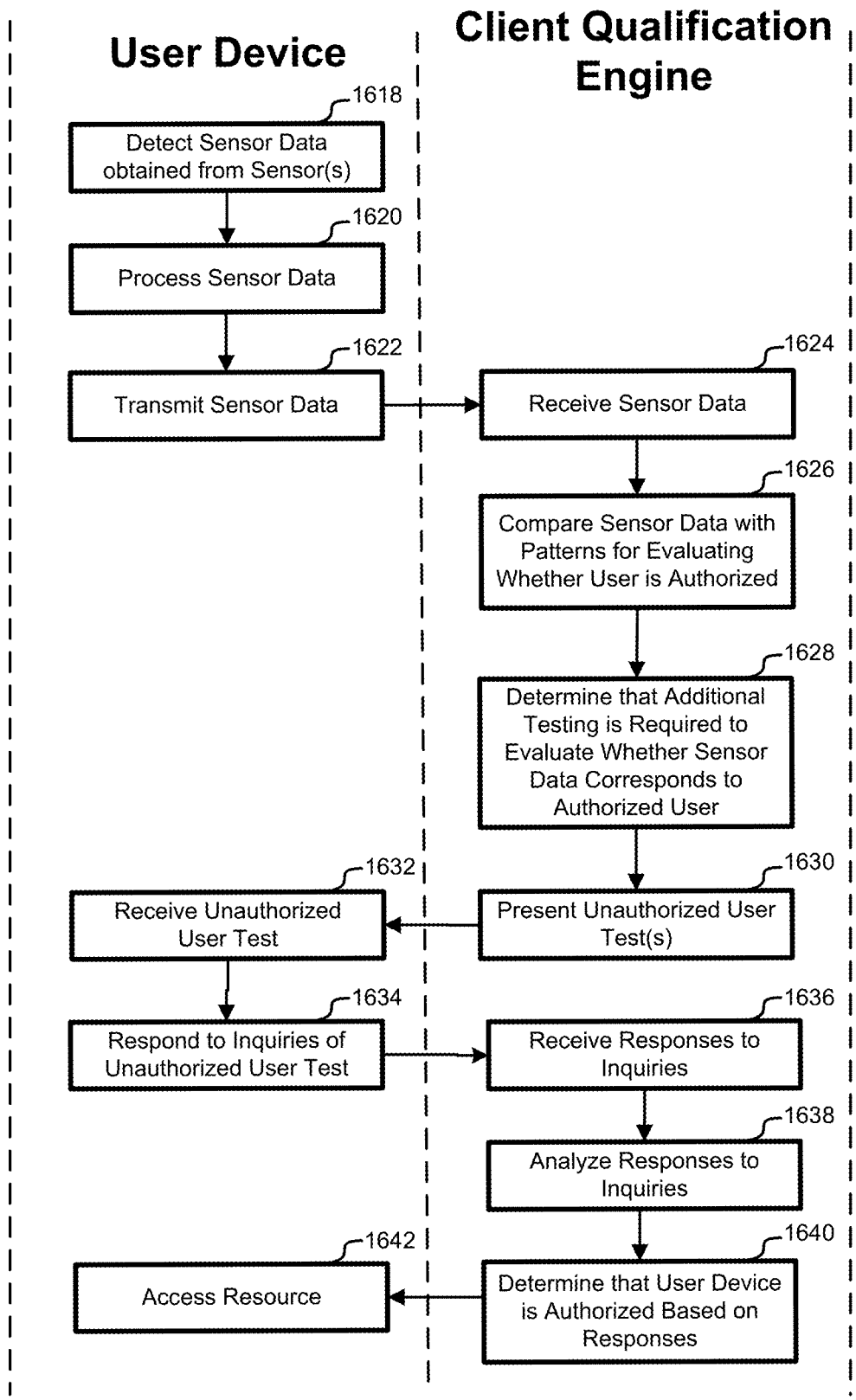
Figure 16C:
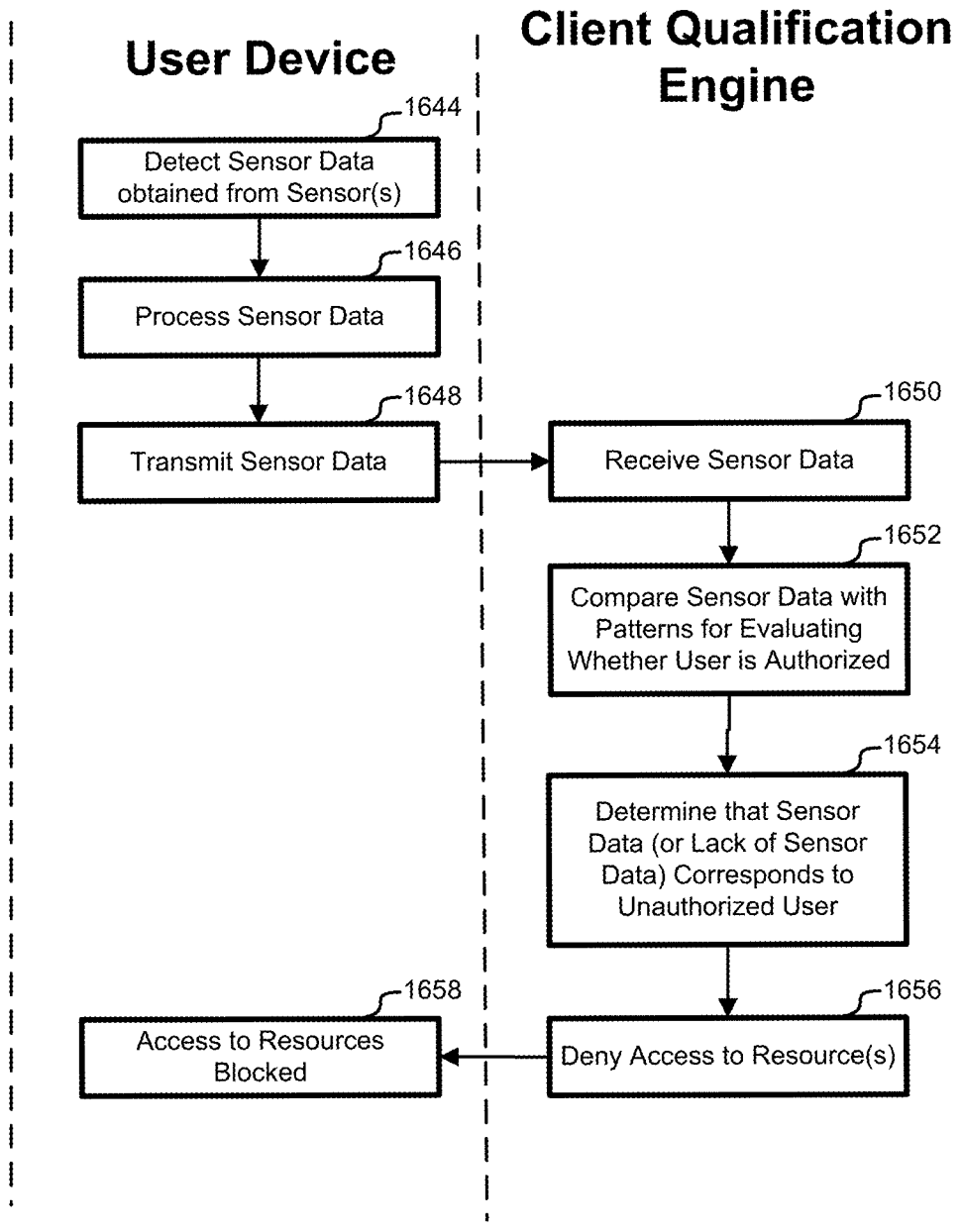

FIGS. 16A-16C are swim lane diagrams illustrating an embodiment of a process for using sensor data to influence presentation of unauthorized user tests. FIGS. 16A-16C illustrate the various processes that may occur depending on a result of an analysis of the sensor data. For example, whether or not an unauthorized user test is presented, or whether or not the user is granted access to the resources without having to satisfy an unauthorized user test, may depend on the analysis of the sensor data (which may occur at the agent characterizer 1125, for example). In FIG. 16A, at step 1602, the user device (e.g., mobile device A 410, mobile device B 430, or user devices 1300-A, 1300-B, and/or 1400) may detect sensor data obtained by the sensors (e.g., sensors 1312-1314 and/or 1340-1342). At step 1604, the user device may process the sensor data. However, in some embodiments, the sensor data may not be processed and may be transmitted over network 455 in raw form. At step 1606, the user device transmits the sensor data to the resource management system 100 over the network 455. Since the user device may be a mobile device, the sensor data may be transmitted wirelessly to the network 455. At step 1608, the sensor data is received at the client qualification engine (e.g., client qualification engine 920). At block 1610, the received sensor data is compared with one or more templates or patterns stored in the pattern store 1135. At block 1612, when the client qualification engine 920 determines that the sensor data corresponds to an authorized user (e.g., a human user, a mobile phone user 110-A, etc.), then the process proceeds to block 1614, which grants the user device access to the requested resource. At block 1616, when the user device is granted access to the resources to access or reserve an item or items of the resources, the user device may access the resource without having to satisfy or respond to an unauthorized user test.

In FIG. 16B, blocks 1618 through 1626 correspond to blocks 1602 through 1610 of FIG. 16A, and thus, are omitted here for the sake of brevity. At block 1628, the client qualification engine 920 determines that additional testing is required to evaluate whether the sensor data corresponds to an authorized user. For example, in block 1628, when the comparison of the sensor data with one or more template or patterns does not result in a characterization of a human or a bot user 150, then further testing using unauthorized user tests may be necessary to determine the proper characterization of the user. As such, at block 1630, the user is presented with one or more unauthorized user tests. At block 1632, the user device receives the unauthorized user test. At block 1634, the user responds to the inquiries presented in the unauthorized user test. For example, the user may respond to the inquiries presented in the unauthorized user test by responding to questions displayed on a screen of the user device, if any. At block 1636, the responses provided by the user are received at the client qualification engine 920. At block 1638, the responses received by the client qualification engine 920 are analyzed by the client qualification engine 920. At block 1640, it is determined that the user device is authorized to access the resources based on the received responses. That is, block 1640 may correspond to condition 1535 (i.e., the test-based human-detection criterion) being satisfied. At block 1642, the user device is granted access to the resource, and thus, may access and/or reserve items of the resources.

In FIG. 16C, blocks 1644 through 1652 correspond to blocks 1602 through 1610 of FIG. 16A, and thus, are omitted here for the sake of brevity. At block 1654, the sensor data, which is received at the client qualification engine 920, is determined to correspond to an unauthorized user 330. For example, the sensor data may correspond to a bot user 150. However, as shown in FIG. 3, unauthorized users 330 are not limited to bot users 150. Other users may also be characterized as unauthorized users 330. In some embodiments, the client qualification engine 920 determines that sensor data does not exist in connection with the request to access resources. A reason for the lack of sensor data may be that the user is a bot user 150 (e.g., a server or server farm), which may not generate or collect sensor data, because the server or server farm performs scripts without the user input by a human. At block 1656, the client qualification engine 920 determines that the user is to be denied or blocked from accessing the resources. At block 1658, the user device is blocked from accessing the resources stored in the resource store 970 of the resource management system 100.

Figure 17:
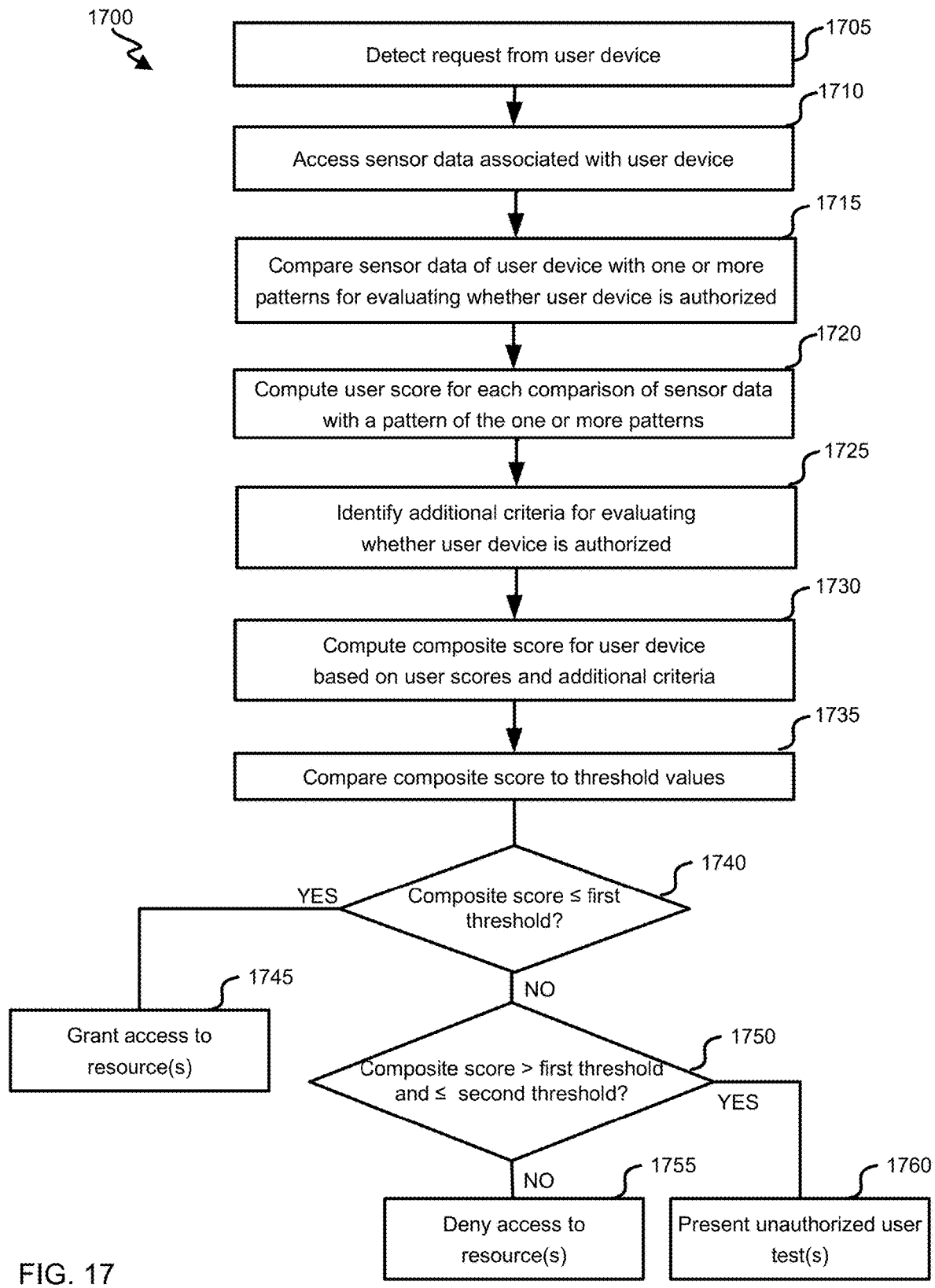
FIG. 17 is a flowchart illustrating another embodiment of a process for using sensor data to influence presentation of unauthorized user tests.

FIG. 17 is a flowchart illustrating another embodiment of a process for using sensor data to influence presentation of unauthorized user tests. In process 1700, at block 1705, a request to access resources (the request originating from the user device, e.g., mobile device A 410, etc.), is detected, for example, at the client qualification engine 920, or the resource management system 100. At block 1710, the sensor data associated with the user device is accessed. For example, in some embodiments, the sensor data may be transmitted from the user device in connection with the transmitted request. In other embodiments, the sensor data is access from a storage, for example, sensor measurement store 1130. At block 1715, the client qualification engine 920 may compare the sensor data associated with the user device with one or more templates or patterns for evaluating whether or not the user device is authorized to access the resources. At block 1720, a user score is computed for each comparison of sensor data with a template or pattern. For example, a first comparison of the sensor data with a first template or pattern may result in a first user score, and a second comparison of the sensor data with a second template or pattern may result in a second user score. At block 1725, the client qualification engine 920 may identify additional criteria for evaluating whether the user device is authorized. The additional criteria may or may not relate to sensor data.

For example, the additional criteria may include how many attempts in the past has the user has been characterized as a human, how many attempts in the past has the user been characterized as a bot user 150, etc. At block 1730, a composite score is calculated corresponding to the user device based on the calculated user scores and identified additional criteria. At block 1735, the composite score is compared to one or more threshold values.

For example, at branch 1740, it is determined whether the composite score is equal to or less than a first threshold value. If "YES," the process 1700 proceeds to block 1745, where the user device is granted access to the resources in order to access or reserve an item or items of the resources. If "NO," the process 1700 proceeds to branch 1750, where it is determined whether the composite score exceeds the first threshold and is equal to or less than the second threshold. If "YES," the process 1700 proceeds to block 1760, where the user is presented with one or more unauthorized user tests. If "NO," the process 1700 proceeds to block 1755, where the user is denied or blocked from accessing the resources.

Figure 18:
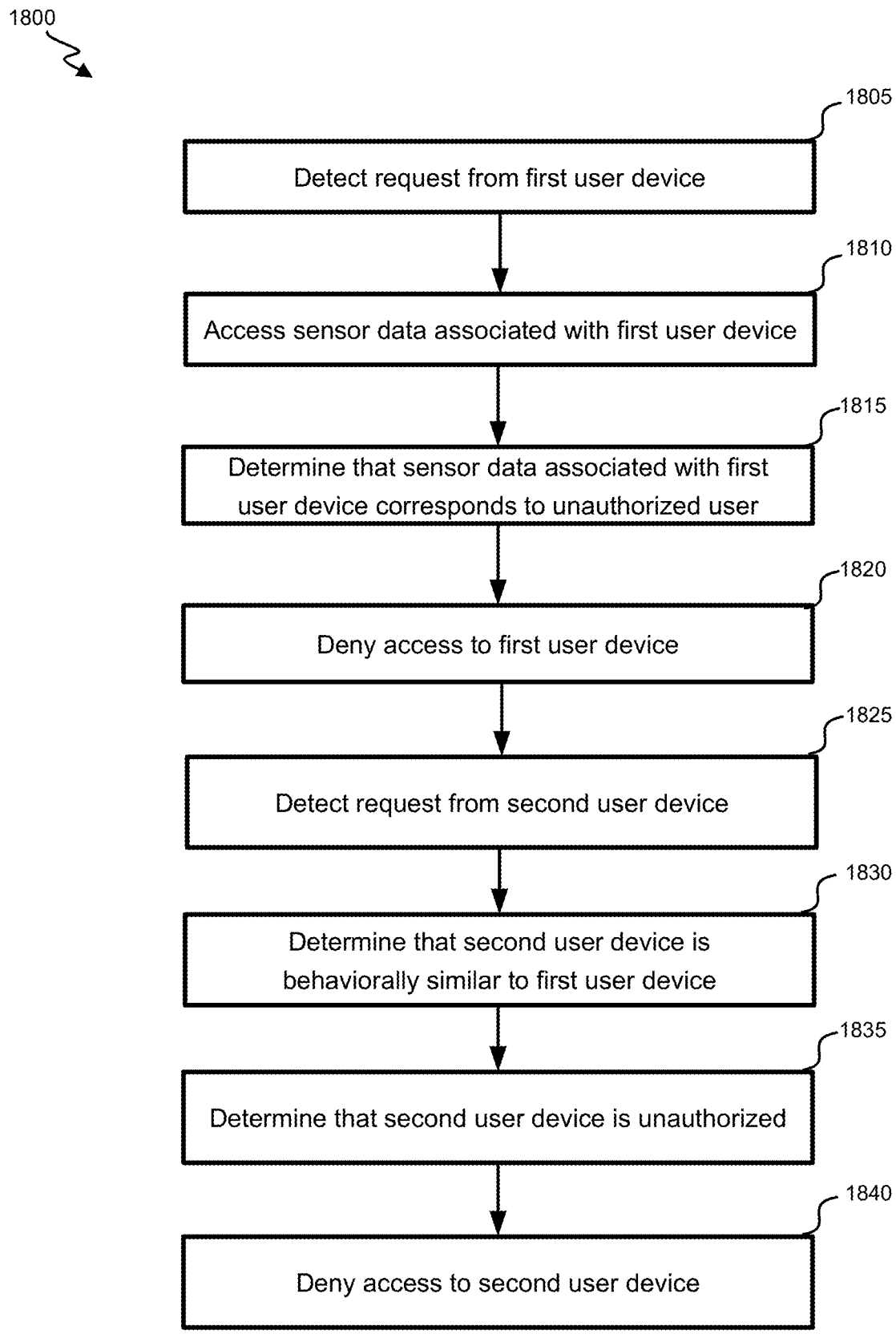
FIG. 18 is a flowchart illustrating yet another embodiment of a process for using sensor data to influence presentation of unauthorized user tests.

FIG. 18 is a flowchart illustrating yet another embodiment of a process for using sensor data to influence the presentation of unauthorized user tests. FIG. 18 illustrates a flowchart of process 1800 for grouping users (e.g., any of the various users 110, 120, 130, 140, 160, 170, and 180) with a previously detected bot user 150, and blocking the grouped users and/or presenting difficult unauthorized user tests to the grouped users. At block 1805, a request (from a first user device) to access resources stored in a resource store 970 of the resource management system 100 may be detected. At block 1810, the sensor data associated with the first user device may be accessed. At block 1815, the sensor data associated with the first user device (e.g., mobile device A 410, mobile device B 430, and users devices 1300-A, 1300-B, and 1400) may be determined to correspond to a bot user 150. As such, the first user is characterized as a bot user 150 and is denied or blocked from accessing the resources. At block 1825, a request (from second user device) to access resources stored in the resource store 970 of the resource management system 100 is detected. The second user device may also correspond to mobile device A 410, mobile device B 430, users devices 1300-A, 1300-B, and/or 1400. At block 1830, it is determined that the second user device is behaviorally similar to the first user device. For example, if the second user device is requesting access to the resources from the same geographical vicinity as the first user device, then the second user device is determined as being behaviorally similar to the first user device. As another example, if the second user device is requesting access to the resources using the same IP address as the first user device, then the second user device is determined as being behaviorally similar to the first user device. However, the second user device and the first user device may be behaviorally similar even if they are not in the same vicinity or using the same IP address. For example, in some embodiments, the second user device may be determined to be behaviorally similar to the first user device if a fee parameter associated with the second user device is the same as a fee parameter associated with the first user device. At block 1835, when the second user is determined as being behaviorally similar to the first user device, the second user device is determined to be unauthorized to access the resources. At block 1840, the second user is denied access to the resources just as the first user was denied access. Using the process 1800 of FIG. 18, second user devices, which may be any of the various user devices 110, 120, 130, 140, 160, 170, and 180, may also be determined as being unauthorized to access the resources even if the second user device is not a bot user 150.

Figure 19:
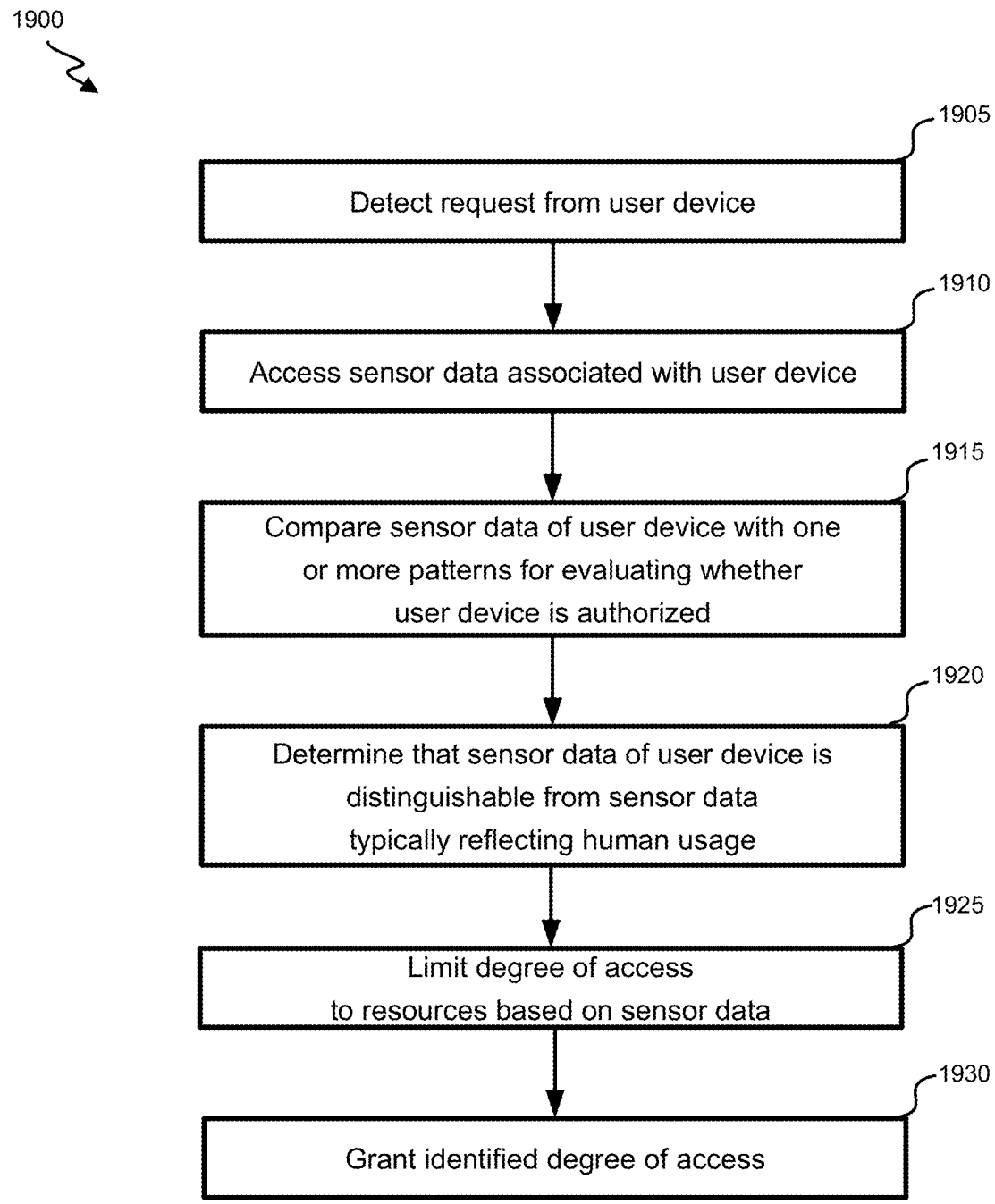
FIG. 19 is a flowchart illustrating yet another embodiment of a process for using sensor data to influence presentation of unauthorized user tests.

FIG. 19 illustrates a flowchart of an embodiment of a process 300 for using sensor data to influence presentation of resources. Process 1900 can be performed, for example, in part or in full at a user device or in the cloud. Process 1900 begins at block 1905 where a request engine detects a request corresponding to a user and user device. The request can correspond to, for example, a request to view resource details and access or reserve resources. In some instances, the request includes visiting a webpage or opening an app.

At block 1910, the agent characterizer 1125 accesses sensor data associated with the user device. The sensor data can include instantaneous data or historical data collected over a previous time period. For example, upon receiving the request, the agent characterizer 1125 can access current measurements being collected by one or more sensors or can access measurements collected over a subsequent time period. As another example, agent characterizer 1125 can access measurements collected previously or over a past time period. The sensor data can include data collected by each of one or more sensors.

At block 1915, the sensor data associated with the user operating the user device is compared with one or more templates or patterns for evaluating whether the user device is authorized. At block 1920, the agent characterizer 1125 determines whether the sensor data associated with the user device is distinguishable from the sensor data typically reflecting human usage. At block 1925, agent characterizer 1125 determines a degree of access to authorize based on the sensor data at block 1920. Block 1920 can include, for example, generating a sensor statistic based on one or more sensor data points, applying a clustering technique, applying a learning technique, analyzing one or more conditions, and/or comparing sensor data (or a processed version thereof) to a template or template characteristic. A degree of access can be limited (e.g., denied, restricted with regard to quantity, only allowed to claim a subset of available resources, granted access at a time late relative to a time at which others are granted access, etc.) when sensor data is distinguishable from sensor data typically reflecting human usage and/or is similar to sensor data typically reflecting bot usage.

Block 1920 can include determining whether resource information is to be made available to a user, determining which resource information is to be made available to a user, determining whether a resource is to be made available for claiming (e.g., reserving) by the user, and/or determining which resource is to be made available to a user. For example, if there are 1000 access rights available for an event, block 1920 can include determining that, based on particular sensor data, 500 of those access rights (e.g., those in lesser demand than the remaining 500) are to be made available for accessing for a corresponding user.

Resource availer 1115 grants the identified degree of access at block 1930. For example, a user can be granted (or denied) access to a particular webpage or app page, a listing or graphic representing resources available to the user can be generated and availed to the user, a transaction or reservation process can be completed (or terminated). Thus, for example, particular items (e.g., associated with particular seating sections, colors, processing speeds, events, etc.) can be presented selectively to users with sensor data satisfying one or more criteria.

In process 1900, resource availing can be influenced by sensor data. It will be appreciated that resource availing can also or alternatively be influenced by other types of data, such as received inputs, user detail data, access history, etc.

Figure 20:
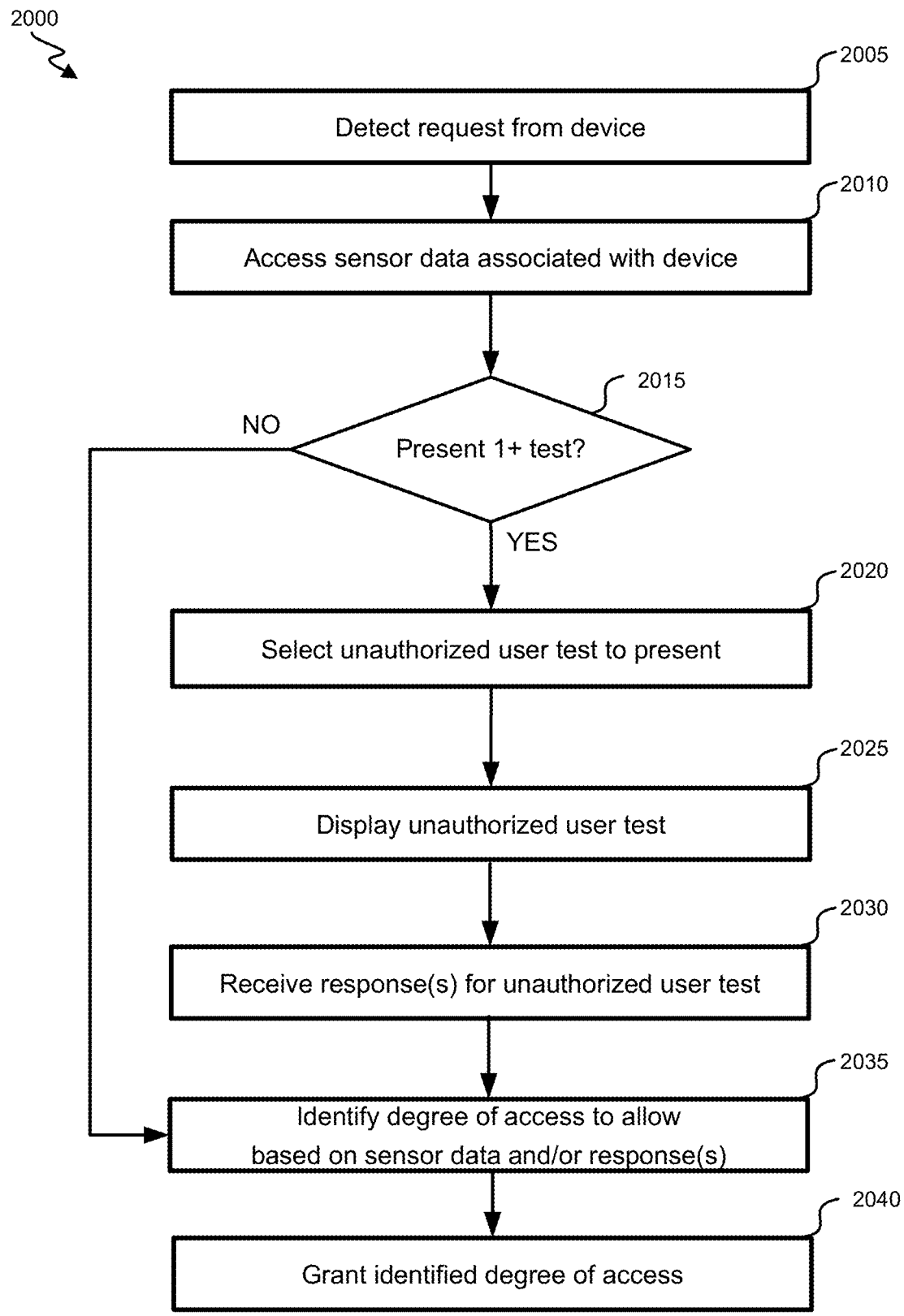
FIG. 20 is a flowchart illustrating yet another embodiment of a process for using sensor data to influence presentation of unauthorized user tests.

FIG. 20 is a flowchart illustrating yet another embodiment of a process for using sensor data to influence presentation of unauthorized user tests. Process 2000 can be performed, for example, in part or in full at a user device or in the cloud. Blocks 2005, 2010 and 2040 of process 2000 can correspond to blocks 1905, 1910 and 1930 of process 1900.

In process 2000, sensor data can be used to influence details pertaining to administration of unauthorized user tests. For example, sensor data (and/or one or more other variables, such as user detail data and/or reservation history associated with a user or user device) can be used to determine whether any unauthorized user tests are to be administered, a number of unauthorized user tests to administer, which tests (or test types) are to be administered and/or a satisfying criterion for each of one or more individual tests or a cumulative satisfying criterion. Thus, in process 2000, sensor data can determine actions performed at one or more of blocks 2015, 2020 and/or 2035.

At block 2015, virtual test engine 1120 can determine, based on the sensor data, whether any unauthorized user tests are to be provided. This determination can be based on, for example, determining one or more characteristics of the sensor data and comparing the one or more characteristics to a corresponding one or more characteristics for each of one or more templates (e.g., a human-usage template, a template for a particular human user or a template for a bot). This determination can further be based on a statistic of the sensor data, such as a temporal variation statistic.

When it is determined that one or more tests are to be presented, at block 2020, virtual test engine 1120 selects one or more unauthorized user tests (e.g., CAPTCHA test(s)) to display on a display of the user device. The selection may, or may not, be based on the sensor data. For example, a number or identity of a test can be determined based on the sensor data (e.g., determining a degree to which it matches template data). In some instances, one or more test types and/or difficulty levels are identified at block 2020 (e.g., determining that a moderate-difficulty visual CAPTCHA test is to be presented along with a low-difficulty audio CAPTCHA test). In some instances, block 2020 includes retrieving one or more tests from a data store. In some instances, block 2020 includes generating one or more tests. In some instances, selecting the one or more tests includes identifying one or more answers for each selected test.

At block 2025, virtual test engine 1120 can cause the selected unauthorized user test(s) to be presented at a user device. For example, the test(s) can be transmitted to a user device (e.g., if part of process 2000 is performed at a cloud) or the test(s) can be presented. At block 2030, virtual test engine 1120 can receive a response for each bot-selection test.

After determining that no unauthorized user tests are to be presented or after receiving one or more responses to presented tests, agent characterizer 1125 identifies a degree of access to authorize based on the sensor data and/or the received response(s) at block 2035. Block 2035 can include analyzing the received response(s). For example, block 2035 can include determining whether and/or an extent to which a response matches a correct response and/or whether a satisfying criterion for one or more responses is satisfied.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by satisfying and/or receiving information, data, arguments, parameters, and/or memory contents. Information, arguments, parameters, data, etc. can be satisfied, forwarded, or transmitted via any suitable means including memory sharing, message satisfying, resource satisfying, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:

detecting, at a resource management system, a request pertaining to one or more items of resources, the request having originated at a user device operated by a user, the user device being configured to include a display and a processor that communicates with at least one sensor, the at least one sensor detecting sensor data associated with the user, the detected sensor data being stored on the user device;

receiving the sensor data stored in the user device;

evaluating the sensor data and generating an agent-characterization result based on the sensor data and based on a number of times the user has gained access to the one or more items of resources, the agent-characterization result being indicative of whether or an extent to which a characteristic of the sensor data corresponds to a human-user characteristic;

determining, based on the agent-characterization result, whether an unauthorized user test is to be displayed on the display of the user device;

when it is determined that the unauthorized user test is to be displayed on the display of the user device:

identifying one or more unauthorized user tests comprising the unauthorized user test to be displayed on the display of the user device based on the sensor data, and including determining a number of unauthorized user tests to present based on the sensor data;

displaying the unauthorized user test;

receiving a response to the unauthorized user test; and processing the response to the unauthorized user test to determine whether a satisfying criterion is satisfied; and when it is determined that the unauthorized user test is not to be displayed or that the satisfying criterion is satisfied, authorizing the user operating the user device to access the one or more items of resources.

2. The computer-implemented method of claim 1, wherein the determining of whether the unauthorized user test is to be displayed comprises:

identifying one or more test-satisfying criteria, wherein the identification of the one or more test-satisfying criteria is based on the sensor data.

3. The computer-implemented method of claim 1, further comprising:

processing the one or more responses and the sensor data to identify a degree of electronic access to authorize for the user device; and authorizing resources to be electronically accessed in accordance with the identified degree of electronic access via the user device.

4. The computer-implemented method of claim 2, wherein the identifying of the one or more unauthorized user tests is based on the sensor data and includes determining a level of difficulty of the unauthorized user tests to display based on the sensor data, the level of difficulty corresponding to a difficulty level associated with a bot user successfully satisfying the unauthorized user tests.

5. The computer-implemented method of claim 1, further comprising:

monitoring measurements from the at least one sensor in the user device during a period of time; and determining a template sensor-data characteristic based on the measurements.

6. A computer-program product tangibly embodied in a non-transitory machine-readable storage medium, including instructions configured to cause a data processing apparatus to perform operations including:

detecting a request pertaining to one or more items of resources, the request having originated at a user device operated by a user, the user device being configured to include a display and a processor that communicates with at least one sensor, the at least one sensor detecting sensor data associated with the user, the detected sensor data being stored on the user device;

receiving the sensor data stored in the user device;

evaluating the sensor data and generating an agent-characterization result based on the sensor data and based on a number of times the user has gained access to the one or more items of resources, the agent-characterization result being indicative of whether or an extent to which a characteristic of the sensor data corresponds to a human-user characteristic;

determining, based on the agent-characterization result, whether an unauthorized user test is to be displayed on the display of the user device;

when it is determined that the unauthorized user test is to be displayed on the display of the user device:

identifying one or more unauthorized user tests comprising the unauthorized user test to be displayed on the display of the user device based on the sensor data, and including determining a number of unauthorized user tests to present based on the sensor data;

displaying the unauthorized user test;

receiving a response to the unauthorized user test; and processing the response to the unauthorized user test to determine whether a satisfying criterion is satisfied; and when it is determined that the unauthorized user test is not to be displayed or that the satisfying criterion is satisfied, authorizing the user operating the user device to access the one or more items of resources.

7. The computer-program product of claim 6, wherein the determining of whether the unauthorized user test is to be displayed comprises:

identifying one or more unauthorized user tests to be displayed on the display of the user device;

identifying one or more test-satisfying criteria, wherein the identification of the one or more test-satisfying criteria is based on the sensor data.

8. The computer-program product of claim 6, further comprising:

processing the one or more responses and the sensor data to identify a degree of electronic access to authorize for the user device; and authorizing resources to be electronically accessed in accordance with the identified degree of electronic access via the user device.

9. The computer-program product of claim 7, wherein the identifying of the one or more unauthorized user tests is based on the sensor data and includes determining a level of difficulty of the unauthorized user tests to display based on the sensor data, the level of difficulty corresponding to a difficulty level associated with a bot user successfully satisfying the unauthorized user tests.

10. The computer-program product of claim 6, further comprising:
monitoring measurements from the at least one sensor in the user device during a period of time; and
determining a template sensor-data characteristic based on the measurements.

11. A system, comprising:
one or more processors; and
a non-transitory computer-readable storage medium containing instructions which, when executed on the one or more processors, cause the one or more processors to perform operations including:
detecting a request pertaining to one or more items of resources, the request having originated at a user device operated by a user, the user device being configured to include a display and a processor that communicates with at least one sensor, the at least one sensor detecting sensor data associated with the user, the detected sensor data being stored on the user device;
receiving the sensor data stored in the user device;
evaluating the sensor data and generating an agent-characterization result based on the sensor data and based on a number of times the user has gained access to the one or more items of resources, the agent-characterization result being indicative of whether or an extent to which a characteristic of the sensor data corresponds to a human-user characteristic;
determining, based on the agent-characterization result, whether an unauthorized user test is to be displayed on the display of the user device;
when it is determined that the unauthorized user test is to be displayed on the display of the user device:
identifying one or more unauthorized user tests comprising the unauthorized user test to be displayed on the display of the user device based on the sensor data, and including determining a number of unauthorized user tests to present based on the sensor data;
displaying the unauthorized user test;
receiving a response to the unauthorized user test; and
processing the response to the unauthorized user test to determine whether a satisfying criterion is satisfied; and
when it is determined that the unauthorized user test is not to be displayed or that the satisfying criterion is satisfied, authorizing the user operating the user device to access the one or more items of resources.

12. The system of claim 11, wherein the determining of whether the unauthorized user test is to be displayed comprises:
identifying one or more unauthorized user tests to be displayed on the display of the user device;
identifying one or more test-satisfying criteria, wherein the identification of the one or more test-satisfying criteria is based on the sensor data.

13. The system of claim 11, further comprising:
processing the one or more responses and the sensor data to identify a degree of electronic access to authorize for the user device; and
authorizing resources to be electronically accessed in accordance with the identified degree of electronic access via the user device.

14. The system of claim 12, wherein the identifying of the one or more unauthorized user tests is based on the sensor data and includes determining a level of difficulty of the unauthorized user tests to display based on the sensor data, the level of difficulty corresponding to a difficulty level associated with a bot user successfully satisfying the unauthorized user tests.

15. The system of claim 11, further comprising:
monitoring measurements from the at least one sensor in the user device during a period of time; and
determining a template sensor-data characteristic based on the measurements.

16. The computer-implemented method as claimed in claim 1, wherein when it is determined that the unauthorized user test is displayed or that the satisfying criterion is not satisfied, identifying a level of restriction for the user operating the user device to access the one or more items of resources.

* * * * *